United States Patent
Sollami et al.

(10) Patent No.: US 11,531,885 B2
(45) Date of Patent: Dec. 20, 2022

(54) TRAINING DATA GENERATION FOR VISUAL SEARCH MODEL TRAINING

(71) Applicant: salesforce.com, inc., San Francisco, CA (US)

(72) Inventors: Michael Sollami, Cambridge, MA (US); Yang Zhang, Cambridge, MA (US)

(73) Assignee: Salesforce, Inc., San Francisco, CA (US)

( * ) Notice: Subject to any disclaimer, the term of this patent is extended or adjusted under 35 U.S.C. 154(b) by 578 days.

(21) Appl. No.: 16/658,327

(22) Filed: Oct. 21, 2019

(65) Prior Publication Data
US 2021/0117773 A1  Apr. 22, 2021

(51) Int. Cl.
*G06N 3/08* (2006.01)
*G06N 3/04* (2006.01)
*G06K 9/62* (2022.01)
*G06T 3/40* (2006.01)

(52) U.S. Cl.
CPC ............. *G06N 3/08* (2013.01); *G06K 9/6218* (2013.01); *G06K 9/6256* (2013.01); *G06N 3/0454* (2013.01); *G06T 3/40* (2013.01)

(58) Field of Classification Search
None
See application file for complete search history.

(56) References Cited

U.S. PATENT DOCUMENTS 10,824,942 B1 * 11/2020 Bhotika ................. G06F 16/56

* cited by examiner

*Primary Examiner* — Leon Flores
(74) *Attorney, Agent, or Firm* — Butzel Long

(57) ABSTRACT

Systems, device and techniques are disclosed for training data generation for visual search model training. A catalog including catalog entries which may include images of an item and data about the item may be received. Labels may be applied to the images of the items based on the data about the items. The images of the items may be sorted into clusters using cluster analysis on the labels. Each cluster may include labels as categories of the cluster. Additional images may be received based on searching for the categories. Generative adversarial network (GAN) training data sets may be generated from the images of the items, the additional images, and the categories. GANs may be trained with the GAN training data sets. The GANs may generate images including images of generated items, which may be replaced with images of items from the catalog entries to create feature model training images.

20 Claims, 14 Drawing Sheets

TRAINING DATA GENERATION FOR VISUAL SEARCH MODEL TRAINING

BACKGROUND

Machine learning models for visual search may be more effective when they are trained on larger training data sets. Obtaining "in the wild" images that are labeled in the proper manner to be part of a training data that can be used to train a machine learning model for visual search may be difficult, as most "in the wild images" may not be labeled at all and labeling them may be time consuming.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
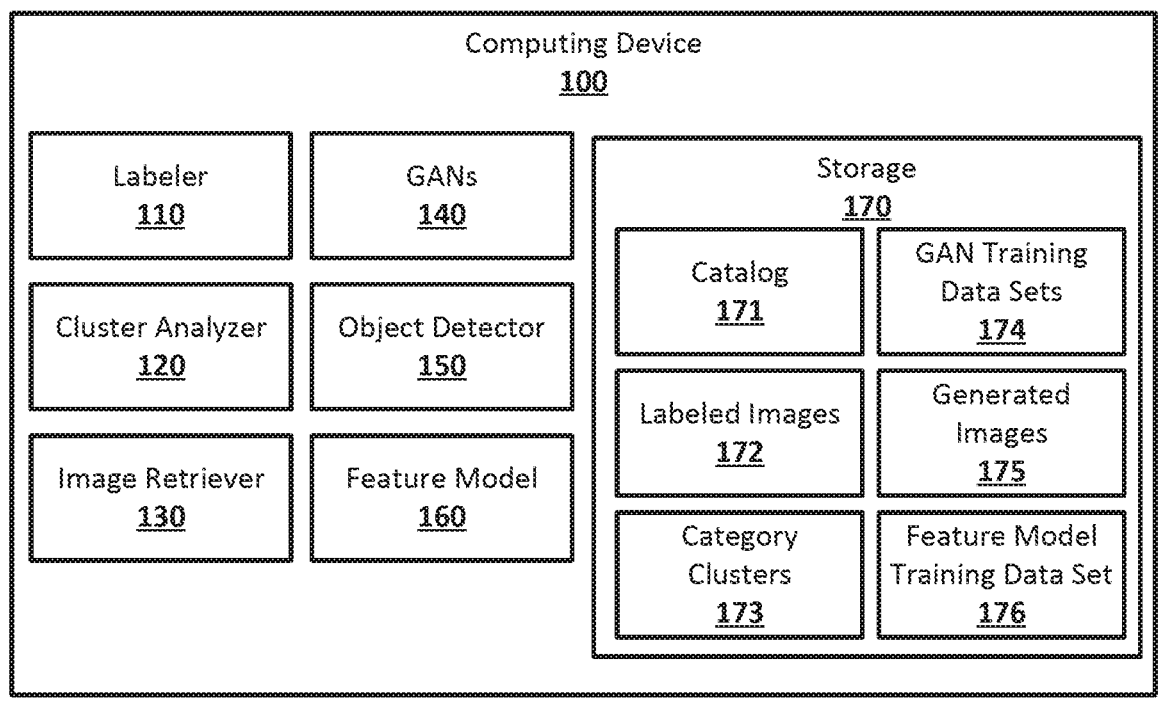
FIG. 1 shows an example system for training data generation for visual search model training according to an implementation of the disclosed subject matter.

Techniques disclosed herein enable training data generation for visual search model training, which may allow for the generation images for a training data set that may be used to train a visual search model. A catalog may include catalog entries, which may include images of items and data about the item, which may be text descriptions and metadata. The images of an item in a catalog entry may be labeled using the data about the item from the catalog entry, creating a set of labeled images. A cluster analysis may be performed on the labeled images to sort the images into clusters based on their labels. A single image may be placed in multiple clusters. Each cluster may be labeled with a category that may be the label or labels that the cluster analysis used to sort images into the cluster. The categories for each cluster may be searched to retrieve "in the wild" images which may be labeled and added to the labeled images in the clusters. The images in the clusters may be used as training data sets for generative adversarial networks (GANs), with different GANs being trained using different ones of the clusters as a training data set. A GAN, after being trained, may be used to generate images that appear to be "in the wild" images which include images of generated items of the same type as the items in the labeled images from the training data set used to train the GAN. An object detector may be used to detect the images of generated items in the GAN generated images and replace them with images of items of the same type from the labeled images or catalog, generating an image for a training data set for a feature model. The training data set for a feature model may be used to train a feature model to identify items from the catalog, and their catalog entries, that are in, or correspond most closely to items in, target images that may be actual "in the wild" images.

A catalog with catalog entries for items may be received from any suitable source, and may be in any suitable format. For example, the catalog entries of the catalog may include products listed for sale on a website, and the item in the catalog entry may be one of the products. The catalog entries may be in a format for use as part of a website. Catalog entries may include images of items, including images of the item by itself, studio images of the item in use, and images that may appear to be "in the wild" images, for example, images of the item in use outside of a studio. For example, a catalog entry for a pair of gloves may include images of the gloves by themselves, images of the gloves on a person's hand taken in a studio, and images of gloves on a person's hands taken outdoors while the person is engaged in some form of outdoor activity. Catalog entries may include data about the item in the catalog entry, including unstructured or natural language text describing the item, and metadata about the item. For example, a catalog entry for a shirt may include a product name for the shirt, a text description of the shirt that may be the result of copywriting, various measurements for the shirt, and other metadata about the shirt.

The images of items in the catalog entries in the catalog may be labeled using the data in the catalog entry. The data in a catalog entry, including any text and metadata, may be used to label the images. The labels may be, for example, categories which describe the item in the catalog entry, including, for example, physical attributes of the item, such as size, shape, color, pattern, texture, and materials, and descriptions of the item type and use, including categories and subcategories. For example, an image of black leather gloves may be labeled with "black", "leather", "upper body clothing", and "gloves". The labels may also include categories which describe features of images of an item beyond what's described in the data in the catalog entry. For example, an image of person wearing black leather gloves outdoors may be labeled with a description of the person, what's in the foreground and background of the image, and properties of the black leather gloves that may be not be described in the data in the catalog entry for the black leather gloves. The images may be labeled in any suitable manner. For example, labeling may be performed by any suitably trained machine learning model or any suitable heuristic model or rules-based model. The labeling may use a predefined list of categories as labels. The predefined list of categories may be a hierarchical ontology of words that may describe categories that items may belong to, and may be universal, or may be based on the type of items in the catalog. The labeled images may be considered to be weakly labeled.

The labeled images may be sorted into clusters using cluster analysis. The cluster analysis may be a multiple embedding cluster analysis which may organize the labeled images into clusters for categories according to their labels in multiple dimensions. A single labeled image may be clustered into multiple different clusters for different categories. A labeled image may, for example, be clustered according to its color, shape, and use into a separate cluster for each category. For example, an image of black leather gloves may be clustered in a cluster for a "black" category with other images of items that are black, into a cluster for a "leather" category with other images of items that are made out of leather, into a cluster for an "upper body clothing" category with other items that are worn on the upper body, and into a cluster for a "gloves" category that includes images of other gloves. The labels used to sort images into a cluster may be used as the categories for that cluster.

The categories of the clusters may be used in an image search to obtain additional images to be added to the images in the clusters. The images may be obtained in any suitable manner and from any suitable source, such as, for example, through using the categories as search terms in an Internet image search. The obtained images may be "in the wild" images, which may be, for example, images that are not the result of studio photography or other professional photography, and may be images in which items similar to those in the labeled images appear. For example, searches using the categories of the clusters may obtain images of people wearing black gloves, leather gloves, and black leather gloves. The obtained images may be images in which the items are not the focus of the image. The obtained images may be labeled using the terms that were searched to obtain the image, and may be added to the labeled images from the clusters for those categories. The labeled images from the catalog and the labeled images obtained through using the categories of the clusters as search terms that are in the same category and are "in the wild" images may be added to a GAN training data set for that category and may be labeled as being positive examples. The same image may appear in multiple GAN training data sets if that image was clustered into multiple categories or was obtained using a search term that included multiple categories. Images with labels that do not belong to the category of a GAN training data set, or images that are not "in the wild", may also be added to a GAN training data set to and labeled as negative examples. For example, additional "in the wild" images obtained searching for "gloves" may be added to the images in the cluster labeled "gloves" that are "in the wild" images as positive examples for a GAN training data set for "gloves." Images that do not include gloves, or that do include gloves but are not "in the wild" images, for example, are the result of studio photography or are images of the gloves by themselves, may be added to the GAN training data set for "gloves" as negative examples.

The GAN training data sets may be used to train GANs to generate "in the wild" images that include images of items of the same type as the items in the images of the GAN training data sets. The images from a GAN training data set for a category may be input to a discriminator network of a GAN. The discriminator network may be, for example, a convolutional neural network with any suitable number of layers and weights connected in any suitable manner. For each image from the training data set input to the discriminator network, the discriminator network may output an indication of whether or not the image is a positive example, for example, an "in the wild" image that includes an image of an item that belongs to the categories of the GAN training data set. For example, if the GAN training data set is for the category "gloves", the output from the discriminator network based on an input image may be an indication as to whether the discriminator network determines that the image includes an image of gloves and is an "in the wild" image. The output from the GAN may be binary, or may be a probability, for example, a probability that the input image is a positive example from the GAN training data set. Errors in the indications output by the discriminator network, for example, identifying a negative example from the GAN training data set as a positive example, may be used to adjust the discriminator network. For example, backpropagation may be used to adjust the weights of the discriminator network, training the discriminator network based on errors made by the discriminator network. The discriminator network may be trained for any suitable length of time, using any suitable number of the images from the GAN training data set.

After the discriminator network of the GAN has been trained for a set length of time or on a set number of images from the GAN training data set, a generator network of the GAN may be trained. The generator network of the GAN may be, for example, a neural network that may include any suitable number of layers and weights connected in any suitable manner. A random input may be input to the generator network. The random input may be, for example, a vector with any suitable number of elements set to random or pseudorandom values. The generator network may output an image. The image output by the generator network may be input to the discriminator network, which may output an indication of whether the image is a positive example, for example, an "in the wild" image that includes an image of an item that belongs to the categories of the GAN training data set, or not. When the discriminator network indicates that the image is not a positive example, for example, is a negative example, the weights of the generator network may be adjusted, for example, through backpropagation, training the generator network. The generator network may be trained based on a loss function for the generator network. The generator network may be trained for any suitable length of time, using any suitable number of random inputs.

After the generator network of the GAN has been trained for a set length of time or been given a set number of random inputs, the discriminator network may be trained again sing the GAN training data set. Images generated by the generator network during the training of the generator network may also be added to the GAN training data set. The images generated by the generator network may be labeled based on the indication the discriminator network output for the images. The discriminator network may be trained for any suitable length of time, using any suitable number of the images from the GAN training data set, after which the generator network may be trained again for any suitable length of time, using any suitable number of random inputs. Training may alternate between the discriminator network and the generator network, and may continue for any suitable period of time. For example, the discriminator network and generator network may be trained until the discriminator network reaches a threshold level of accuracy on the training data set and a threshold percentage of images output by the generator network are indicated by the discriminator network as being images of positive examples.

Any number of GANs may be trained using the GAN training data sets. For example, if the cluster analysis creates N clusters, resulting in N separate GAN training data sets, N separate GANs may be trained, one for each of the GAN training data sets. Each of the GANs may be trained using a separate one of the GAN training data sets.

The trained GANs may be used to generate images. Each trained GAN may receive any number of random inputs to its generator network. Images generated by the generator network may be input to the discriminator network. Images that the discriminator network indicates are positive examples may be output by the GAN, while images that the discriminator network indicates are negative examples may be discarded. The images output by the trained GANs may be generated images that appear to be "in the wild" images and may include an image of a generated item which may be of the same type as items from the catalog entries of the catalog. The generated items in a generated image may be based on the GAN training data set that was used to train the GAN that generated the image. For example, a GAN trained with a GAN training data set for the category of "gloves" may generate images that include images of generated people wearing generating images of gloves, while a GAN trained with a GAN training data set for the category of "shirts" may generate images that include images of generated people wearing shirts. The images generated by the GANs may be labeled using the labels of the positive examples from the GAN training data set used to the train the GAN, which may be the category of the cluster whose images are in the GAN training data set.

The generated images output by the GANs may be input to an object detector, which may perform object transference on the images. The object detector may be, for example, a machine learning model such as neural network trained to detect objects in images and perform object transference. The objects detected in generated images by the object detector may be the images of generated items of the same type as the items in the catalog entries of the catalog. For example, the object detector may detect the generated image of gloves in a generated image from the GAN that was trained using the GAN training data set for the category of "gloves." The object detector may use a label from the generated image when locating an object in the image. For example, the object detector may look for gloves in a generated image labeled with "gloves."

After detecting an image of a generated item in a generated image, the object detector may perform object transference, transferring an image of an item from a catalog entry of the catalog onto the image of the generated item in the generated image. For example, the object detector may transfer an image of gloves from a catalog entry of the catalog onto an image of generated gloves in the generated image, so that the gloves from the catalog entry may appear in the generated image in place of the image of generated gloves. The object detector may, for example, use the label from the generated image to determine which images from the catalog to use. The object detector may, for example, look up the label in the labeled images. Object transference may result in a feature model training image. If the catalog includes multiple items of the same type as the generated item, multiple feature model training images may be generated from the same generated image. For example, if the catalog includes catalog entries for six different types of gloves, six different feature model training images may be generated from a single generated image that includes an image of generated gloves, with each of the feature model training images including an image of a different one of the gloves from the catalog. The feature model training images may be augmented in any suitable manner, having any suitable augmentations applied to change the appearance of the feature model training images. The augmentations may include, for example, changing the hue, lighting and color of the entirety of a feature model training image or of sections of the feature model training images. The augmentations may also include, for example, rotating, stretching, or shrinking, an object, such as an item or a person, in the feature model training images. The augmentations may be applied randomly to the feature model training images.

The feature model training images generated through object transference may be labeled with an identifier for the catalog entry of the item whose images were transferred into the feature model training images during the generation of the feature model training images. The feature model training image may also be labeled with, for example, the labels that were applied to the image of the item form the catalog when the labeled images were generated. The feature model training images, with labels, may form a feature model training data set.

The feature model training data set may be used to train a feature model. The feature model may be any suitable machine learning model, such as a neural network. The feature model may be a visual search model. The feature model may be trained for any suitable period of time, and in any suitable manner.

For example, the feature model may be a Siamese neural network with triplet loss. The Siamese neural network may include two parallel convolutional networks which may have the same weights. The Siamese neural network may be trained using any suitable loss function, such as, for example, a triplet loss function. To train the Siamese neural network using the triplet loss function, the feature model training images from the feature model training data set and images from catalog entries of the catalog may be used to create triplets of images. Each triplet may include an anchor example, which may be an image of an item from a catalog entry, a positive example, which may be a feature model training image that is labeled with the catalog entry, and a negative example, which may be a feature model training image that is not labeled with the catalog entry. The anchor example, positive example, and negative example may be input to one of the two neural networks, resulting in three output vectors. The distance between the output vector for the anchor example and the output vectors for the positive example and negative example may be determined, and may be used by the triplet loss function to train the neural networks of the Siamese neural network. The triplet loss function may, for example, seek to minimize the distance between output vectors for anchor examples and output vectors for positive examples while maximizing the distance between output vectors for anchor examples and output vectors for negative examples.

After the feature model is trained, the feature model may be used for visual search. For example, a target image that includes an item may be input to the feature model. The target image may be, for example, an "in the wild" image uploaded to the feature model through a search function of an e-commerce website. The feature model may determine which image from a catalog entry of the catalog is most similar to the "in the wild" image, for example, which catalog entries are for items that either are, or are most similar to, the item in the "in the wild" image.

For example, a target image, which may be an "in the wild" image, may be received in a search query and may be input to one of the neural networks of a trained Siamese neural network, and images from the catalog entries may be input to the other neural network of the Siamese neural network. The distance between the output vector resulting from the "in the wild" target image and the output vectors resulting from the images from the catalog entries may be determined. The catalog entries whose images were used to generate the output vectors that are determined to be the closest to the output vector generated from the target image may be considered matches, and may, for example, be returned as the results of the search query. The catalog entries may be for items that may be, or may be similar to, an item in the target image. For example, if a target image includes gloves, the catalog entries returned as search results may be for those gloves, if they are in the catalog, and/or for gloves from the catalog that are visually similar to the gloves in the target image. In some implementations, the output vectors for the images for the catalog may be precomputed, so that the feature model may only need to generate the output vector for the target image and determine the distances between the output vector for the target image and the precomputed output vectors for the images from the catalog.

FIG. 1 shows an example system for training data generation for visual search model training according to an implementation of the disclosed subject matter. A computing device 100 may be any suitable computing device, such as, for example, a computer 20 as described in FIG. 11, or component thereof, for training data generation for visual search model training. The computing device 100 may include a labeler 110, cluster analyzer 120, image retriever 130, GANs 140, object detector 150, feature model 160, and storage 170. The computing device 100 may be a single computing device, or may include multiple connected computing devices, and may be, for example, a laptop, a desktop, an individual server, a server cluster, a server farm, or a distributed server system, or may be a virtual computing device or system, or any suitable combination of physical and virtual systems. The computing device 100 may be part of a computing system and network infrastructure, or may be otherwise connected to the computing system and network infrastructure, including a larger server network which may include other server systems similar to the computing device 100. The computing device 100 may include any suitable combination of central processing units (CPUs), graphical processing units (GPUs), and tensor processing units (TPUs).

The labeler 110 may be any suitable combination of hardware and software of the computing device 100 for applying labels to images from catalog entries of a catalog 171. The labeler 110 may be, for example, a machine learning model such as a neural network, a heuristic labeler, or a rule-based labeler. The labeler 110 may use data in a catalog entry, including any text and metadata, to label images from that catalog entry. The labels may be, for example, categories which describe the item in the catalog entry, including, for example, physical attributes of the item, such as size, shape, color, pattern, texture, and materials, and descriptions of the item type and use, including categories and subcategories. For example, an image of black leather gloves may be labeled with "black", "leather", "upper body clothing", and "gloves". The labels may also include categories which describe features of images of an item beyond what's described in the data in the catalog entry. The labeling may use a predefined list of categories as labels. The predefined list of categories may be a hierarchical ontology of words that may describe categories that items may belong to, and may be universal, or may be based on the type of items in the catalog. The labeled images may be considered to be weakly labeled. Images labeled by the labeler 110 may be stored in the storage 170 as labeled images 172.

The cluster analyzer 120 may be any suitable combination of hardware and software of the computing device 100 for performing cluster analysis. The cluster analyzer 120 may sort the labeled images 172 into clusters using cluster analysis. The cluster analysis may be a multiple embedding cluster analysis which may organize the labeled images 172 into clusters for categories according to their labels in multiple dimensions. A single one of the labeled images 172 may be clustered into multiple different clusters for different categories. A labeled image may, for example, be clustered according to its type, color, shape, and use into a separate cluster for each category. The clusters for the different categories may be stored as category clusters 173, which may be stored in any suitable manner. For example, a category cluster may include references or links to images from the labeled images 172 that are in the category cluster. The labels used to sort images into a cluster may be used as the categories for that cluster.

The image retriever 130 may be any suitable combination of hardware and software of the computing device 100 for retrieving images. The image retriever 130 may retrieve images based on the category clusters 173. The images may be obtained in any suitable manner and from any suitable source, such as, for example, through using the categories of the category clusters 173 as search terms in an Internet image search or any other suitable searchable database of images. The images obtained by the image retriever 130 may include "in the wild" images, which may be, for example, images that are not the result of studio photography or other professional photography, and may be images in which items similar to the items from the catalog 171 in the labeled images 172 appear. For example, the image retriever 130 may perform a search based on the categories of the category clusters 173, which may result in the image retriever 130 receiving images of people wearing black gloves, leather gloves, and black leather gloves. The obtained images may be images in which the items are not the focus of the image. The image retriever 130 may label the images obtained through a search with the terms that were searched to obtain the image, which may be categories from the category clusters 173.

The images obtained by the image retriever 130 by using a category from one of the category clusters 173 as a search term may be added to the category cluster for that category. The images for a category cluster, including both the images from the labeled images 172 and images added by the image retriever 130, that are "in the wild" may be labeled as positive examples and may be added to a GAN training data set for that category as part of GAN training data sets 174. The same image may appear as a positive example in multiple ones of the GAN training data sets 174 if that image was clustered into multiple categories or was obtained using a search term that included multiple categories. Images with labels that do not belong to the category of a GAN training data set or are not "in the wild" may also be added to a GAN training data set labeled as negative examples.

The GANs 140 may be any suitable combination of hardware and software of the computing device 100 for implementing generative adversarial networks. The GANs 140 may each include, for example, a discriminator network, discriminator trainer, generator network, and a generator trainer. The discriminator network of one of the GANs 140 may be a machine learning model, such as a convolutional neural network with any suitable number of layers connected in any suitable manner by any suitable number of weights. The discriminator network may be trained using images from one of the GAN training data sets 174 to identify positive examples from that GAN training data set, which may be "in the wild" images that include an item from the images from that one of the GAN training data sets 174. During training of the discriminator network, the discriminator trainer may determine errors made by the discriminator network in identifying positive examples and negative examples, and adjust the discriminator network through, for example, using backpropagation to adjust the weights of the neural network of the discriminator network. The generator network may be a machine learning model, such as a neural network, that may be trained to output images that may be considered by the discriminator network to be positive examples, for example, "in the wild" images that include the item from the images from the one of the GAN training data sets 174 used to train the discriminator network. During training of the generator network, the discriminator network may determine when the images output by the generator network are negative examples, for example, not considered by the discriminator network to be "in the wild" images that include the item from the images from the one of the GAN training data sets 174 used to train the discriminator network, and the generator trainer may adjust the generator network, for example, through backpropagation. The GANs 140 may include any number of GANs. For example, the GANs 140 may include one GAN for each category cluster of the category clusters 173.

After being trained, the GANs 140 may be used to generate images. Each of the GANs 140 may receive any number of random inputs to its generator network. Images generated by the generator network may be input to the discriminator network. Images that the discriminator network indicates are positive examples may be output by a GAN, while images that the discriminator network indicates are negative examples may be discarded. The images output by the GANs 140 may be generated images that appear to be "in the wild" images and may include an image of a generated item which may be of the same type as items from the catalog entries of the catalog. The images generated by the GANs 140 may be stored as generated images 175.

The object detector 150 may be any suitable combination of hardware and software of the computing device 100 for performing object detection and object transference on images. The object detector 150, for example, be a machine learning model such as neural network trained to detect objects in images and perform object transference. The objects detected in the generated images 175 by the object detector 150 may be the images of generated items of the same type as the items in the catalog entries of the catalog. The object detector 150 may, for example, use the labels of the generated images 175 to determine which object to look for in the generated images 175. After detecting an image of a generated item in a generated image, the object detector 150 may perform object transference, transferring an image of an item from a catalog entry of the catalog onto the image of the generated item in one of the generated images 175. The object detector 150 may, for example, use catalog entry identifiers from the labeled images 172 that correspond to the label from the generated image to look up catalog entries in the catalog 171 and retrieve images from the catalog entries. The images retrieved from the catalog entries may be used in the object transference. Object transference performed by the object detector 150 may result in a feature model training image. The feature model training images generated through object transference may be labeled with an identifier for the catalog entry of the item whose images were transferred during the generation of the feature model training image. The feature model training image may also be labeled with, for example, the labels that were applied to the image of the item from the catalog when the labeled images were generated. The feature model training images, with labels, may form a feature model training data set 176.

The feature model 160 may be any suitable combination of hardware and software of the computing device 100 for performing visual search on target images. The feature model 160 may be any suitable machine learning model, such as a neural network. The feature model 160 may be trained for any suitable period of time, and in any suitable manner, using the feature model training data set 176, to determine catalog entries from the catalog 171 that include items that match, or are similar to, items in target images input to the feature model 160. The feature model 160 may, for example, be a Siamese neural network with triplet loss. The Siamese neural network may include two parallel convolutional networks which may have the same weights. The Siamese neural network may be trained using any suitable loss function, such as, for example, a triplet loss function. To train the Siamese neural network using the triplet loss function, the feature model training images from the feature model training data set 176 and images from catalog entries of the catalog 171 may be used to create triplets of images. Each triplet may include an anchor example, which may be an image of an item from a catalog entry of the catalog 171, a positive example, which may be feature model training image that is labeled with the catalog entry, and a negative example, which may be a feature model training image that is not labeled with the catalog entry. Each of the anchor example, positive example, and negative example may be input to one of the two neural networks, resulting in three output vectors. The distance between the output vector for the anchor example and the output vectors for the positive example and negative example may be determined, and may be used by the triplet loss function to train the neural networks of the Siamese neural network. The triplet loss function may, for example, seek to minimize the distance between output vectors for anchor examples and output vectors for positive examples while maximizing the distance between output vectors for anchor examples and output vectors for negative examples.

After the feature model 160 is trained, the feature model 160 may be used for visual search. For example, a target image that includes an item may be input to the feature model 160. The target image may be, for example, an "in the wild" image uploaded to the feature model 160 through a search function of an e-commerce website. The feature model 160 may determine which image from a catalog entry of the catalog 171 is most similar to the "in the wild" target image, for example, which catalog entries are for items that either are, or are most similar to, the item in the "in the wild" target image.

The storage 170 may be any suitable combination of hardware and software for storing data. The storage 170 may include any suitable combination of volatile and non-volatile storage hardware, and may include components of the computing device 100 and hardware accessible to the computing device 100, for example, through wired and wireless direct or network connections. The storage 170 may store the catalog 171, the labeled images 172, the category clusters 173, the GAN training data sets 174, and generated images 175, and the feature model training data set 176.

Figure 2:
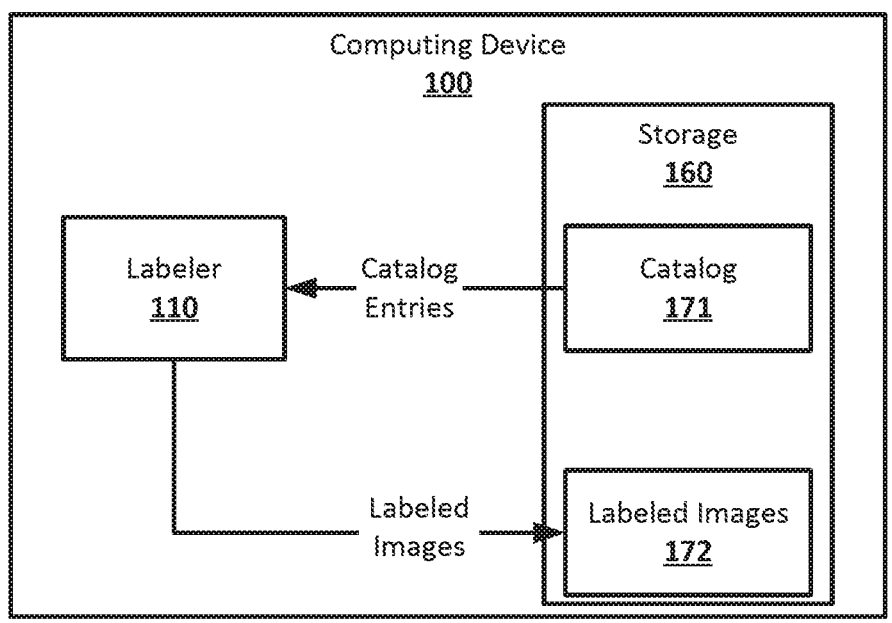
FIG. 2 shows an example arrangement for training data generation for visual search model training according to an implementation of the disclosed subject matter.

FIG. 2 shows an example arrangement for training data generation for visual search model training according to an implementation of the disclosed subject matter. The labeler 110 may receive catalog entries from the catalog 171. The catalog 171 may be stored in the storage 170 from any suitable source. For example, the catalog 171 may be uploaded to the computing device 100 by a retailer using an e-commerce platform. The catalog entries may, for example, include images and data for items, such as products a retailer wishes to sell on an e-commerce platform.

For each of the catalog entries, the labeler 110 may label images from the catalog entry using the data the catalog entry. The data may include, for example, a description, which may be, for example, an unstructured textual description of the item in the catalog entry, and may be written in natural language. The data may include metadata, which may be, for example, structured data about the item, such as, for example, hand labeled categorization data for the item. For example, a catalog entry for gloves may include images of the gloves, a natural language description of the gloves, hand labeled categorization data such as an identification of the item as "gloves", an identification of the material, sizes, and any other suitable properties of the gloves. The labeler 110 may also add labels to an image based on elements of the image that may not be described in the data for the catalog entry. For example, if an image includes a person wearing gloves outdoors, the labeler 110 may label the image with "person" and "outdoors". Images labeled by the labeler 110 may be stored in the labeled images 172.

Figure 3:
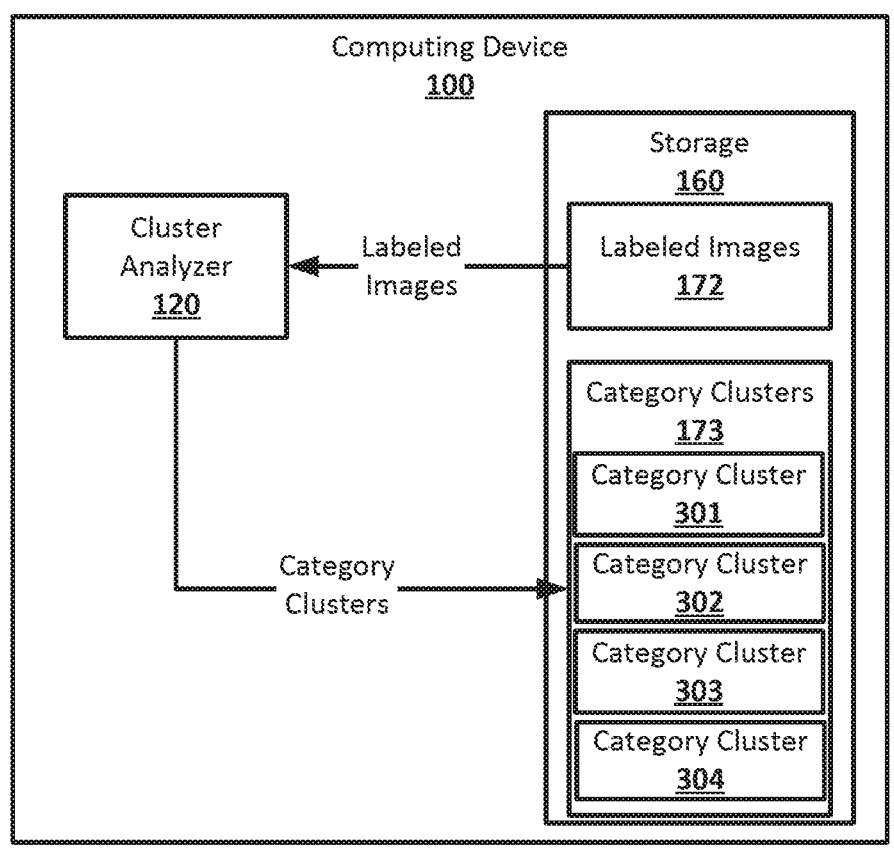
FIG. 3 shows an example arrangement for training data generation for visual search model training according to an implementation of the disclosed subject matter.

FIG. 3 shows an example arrangement for training data generation for visual search model training according to an implementation of the disclosed subject matter. The cluster analyzer 120 may receive the labeled images 172, and may sort the labeled images 172 into the category clusters 173 using cluster analysis. The cluster analysis may be a multiple embedding cluster analysis which may organize the labeled images 172 into the category clusters 173 according to their labels in multiple dimensions. The cluster analyzer 120 may create any number of category clusters, each of which may represent a category from the labels of the labeled images 172. For example, the category cluster 301 may represent a first category, the category cluster 302 may represent a second category, the category cluster 303 may represent a third category, and the category cluster 304 may represent a fourth category. Not all of the labels of the labeled images 172 may be represented by one of the category clusters 173. A single one of the labeled images 172 may be in multiple ones of the category clusters 173. A labeled image may, for example, be clustered according to its item type, color, shape, and use into a separate cluster for each category. For example, a labeled image of leather gloves, with the label "leather" and "gloves" may be in both the category cluster 301, which may be a category cluster for "gloves", and the category cluster 302, which may be a category cluster for "leather." The clusters for the different categories generated by the cluster analyzer 120, for example, the category cluster 301, the category cluster 302, the category cluster 303, and the category cluster 304, may be stored as category clusters 173, which may be stored in any suitable manner. For example, the category cluster 301 may include references or links to images from the labeled images 172 that were sorted into the category cluster 301 by the category analyzer 120. The category cluster 302, the category cluster 303, and the category cluster 304, may similarly include reference and links to the images from the labeled images 172 that were sorted into the respective category clusters.

Figure 4:
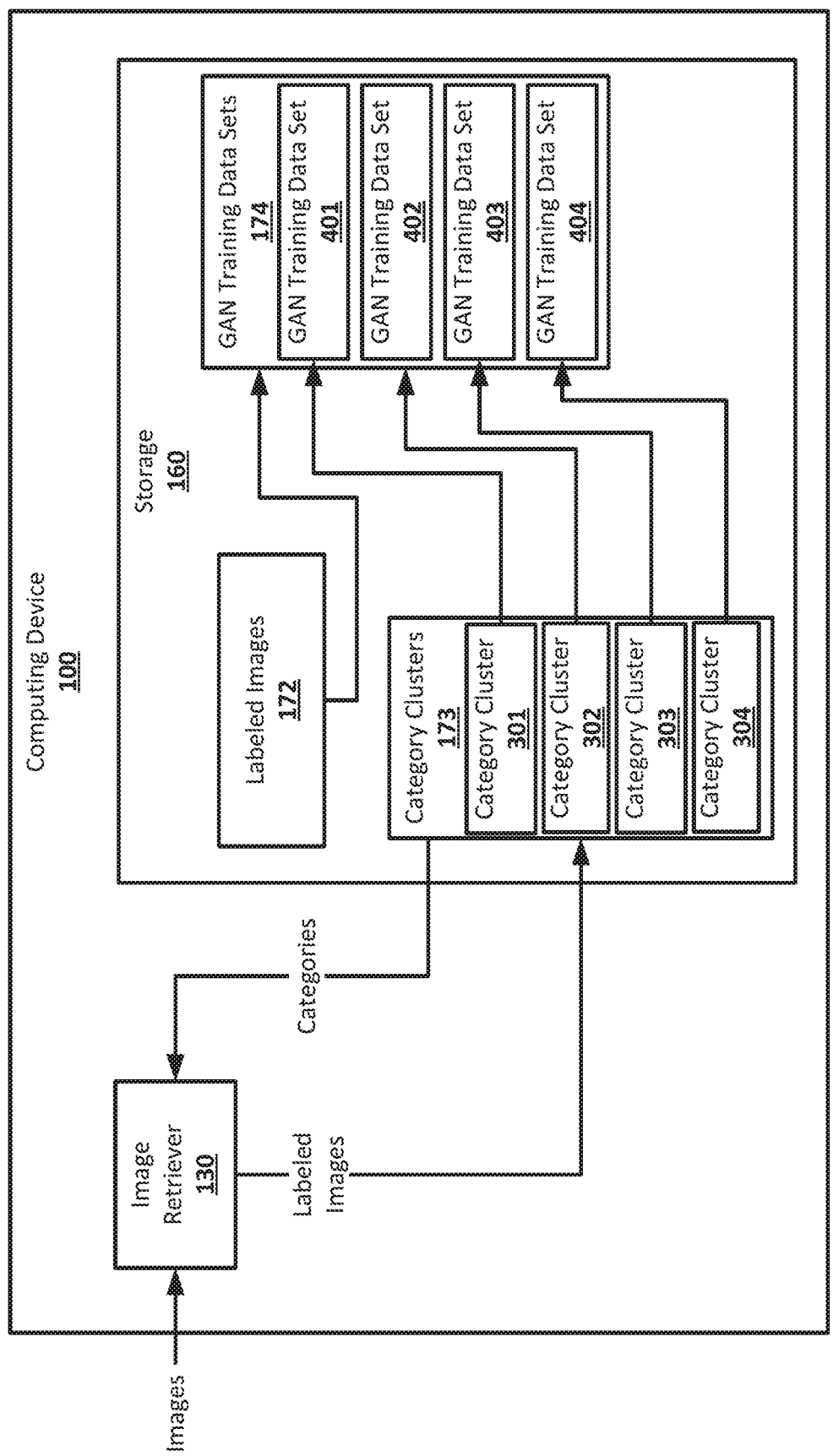
FIG. 4 shows an example arrangement for training data generation for visual search model training according to an implementation of the disclosed subject matter.

FIG. 4 shows an example arrangement for training data generation for visual search model training according to an implementation of the disclosed subject matter. The image retriever 130 may retrieve images based by, for example, using the categories of the category clusters 173 as search terms in a suitable searchable database of images, such as Internet image search database. The images obtained by the image retriever 130 may include "in the wild" images, which may be, for example, images that are not the result of studio photography or other professional photography, and may be images in which items similar to the items from the catalog 171 in the labeled images 172 appear. For example, the image retriever 130 may perform a search based on the categories of the category clusters 173, which may result in the image retriever 130 receiving images of people wearing black gloves, leather gloves, and black leather gloves. The obtained images may be images in which the items are not the focus of the image. The image retriever 130 may label the images obtained through a search with the terms that were searched to obtain the image, which may be categories from the category clusters 173. The image retriever 130 may add the labeled images to the category clusters 173. A labeled image from the image retriever 130 may be added to the category clusters whose categories were used to label the image, as those may be the search terms used to find the image.

The images for a category cluster, including both the images from the labeled images 172 and images added by the image retriever 130, that are "in the wild" images may be added to a GAN training data set for that category and labeled as positive examples. The GAN training data set may be part of GAN training data sets 174. For example, the GAN training data sets 174 may include the GAN training data set 401, the GAN training data set 402, the GAN training data set 403, and the GAN training data set 404, which may each be a GAN training data set for a different one of the category clusters 173, for example, the category cluster 301, the category cluster 302, the category cluster 303, and the category cluster 304. The same image may appear in multiple ones of the GAN training data sets 174 if that image was clustered into multiple categories or was obtained using a search term that included multiple categories. For example, an image from the labeled images 172 or the image retriever 130 that is in both the category cluster 301 and the category cluster 302 may be in the GAN training data set 401 and the GAN training data set 402. Images with labels that do not belong to the category of a GAN training data set, or are not "in the wild" images, may also be added to a GAN training data set labeled as negative examples. The GAN training data sets 174 may be stored in any suitable format, and may store copies of the images from the labeled images 172 and the image retriever 130, or may use references or links to the images.

Figure 5A:
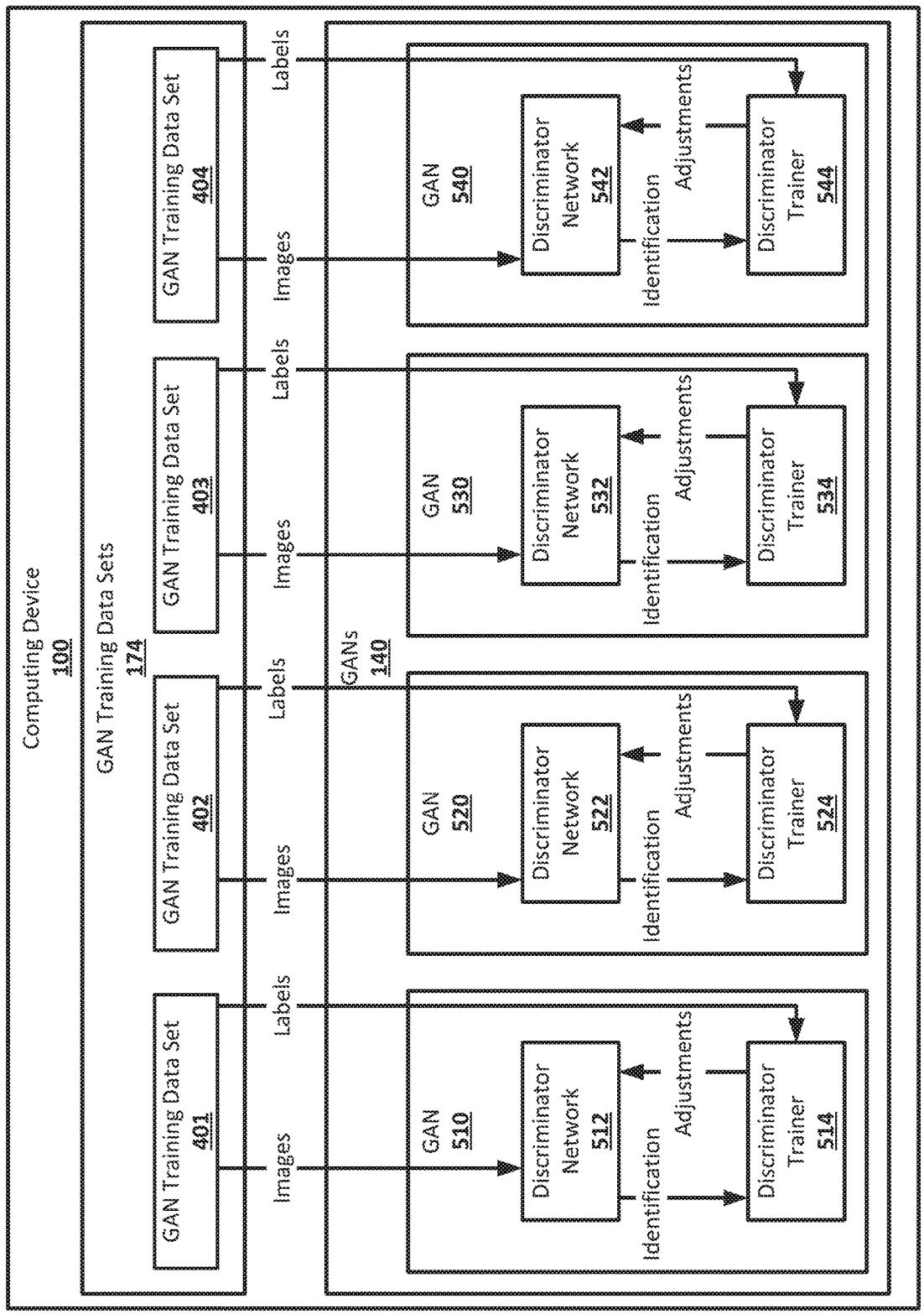
FIG. 5A shows an example arrangement for training data generation for visual search model training according to an implementation of the disclosed subject matter.

FIG. 5A shows an example arrangement for training data generation for visual search model training according to an implementation of the disclosed subject matter. The GANs 140 may include a GAN for each of the GAN training data sets 174. For example, the GANs 140 may include a GAN 510, a GAN 520, a GAN 530, and a GAN 540. The GANs 140 may each include, for example, a discriminator network, discriminator trainer, generator network, and a generator trainer. For example, the GAN 510 may include a discriminator network 512 and a discriminator trainer 514, the GAN 520 may include a discriminator network 522 and a discriminator trainer 524, the GAN 530 may include a discriminator network 532 and a discriminator trainer 534, and the GAN 540 may include a discriminator network 542 and a discriminator trainer 544.

The discriminator networks of the GANs 140 may be trained using images from the of the GAN training data sets 174 to identify "in the wild" images that include an item from the images from that one of the GAN training data sets 174. Each of the GAN training data sets 174, for example, the GAN training data set 401, the GAN training data set 402, the GAN training data set 403, and the GAN training data set 404, may be input to a separate one of the GANs 140, for example, the GAN 510, the GAN 520, the GAN 530, and the GAN 540. The images from the GAN training data sets 174 may be input to the GANs 140 in any suitable form, such as, for example, as feature vectors. The discriminator networks of the GANs 140 may identify input images as either positive examples or negative examples. For example, images from the GAN training data set 401 may be input to the discriminator network 512 of the GAN 510. The discriminator trainers of the GANs 140 may determine errors made by the discriminator networks in identifying positive examples and negative examples, and adjust the discriminator networks through, for example, backpropagation to adjust the weights of the neural network of the discriminator networks. For example, if the discriminator network 512 of the GAN 510 identifies a negative example from the GAN training data set 401 as a positive example, the discriminator trainer 514 may determine that the discriminator network 512 has made an error, and may determine and apply adjustments to the discriminator network 512.

Any number of images from the GAN training data sets 140 may be input to the discriminator networks of the GANs 140, over any suitable period of time, to train the discriminator networks of the GANs 140 during a training cycle. For example, the discriminator network 512 may be trained for a set period of time, such as for one hour, regardless of the number of images from the GAN training data set 401 input to the discriminator network 512 over that time period, and the training cycle for the discriminator network 512 may end at the end of the period of time.

Figure 5B:
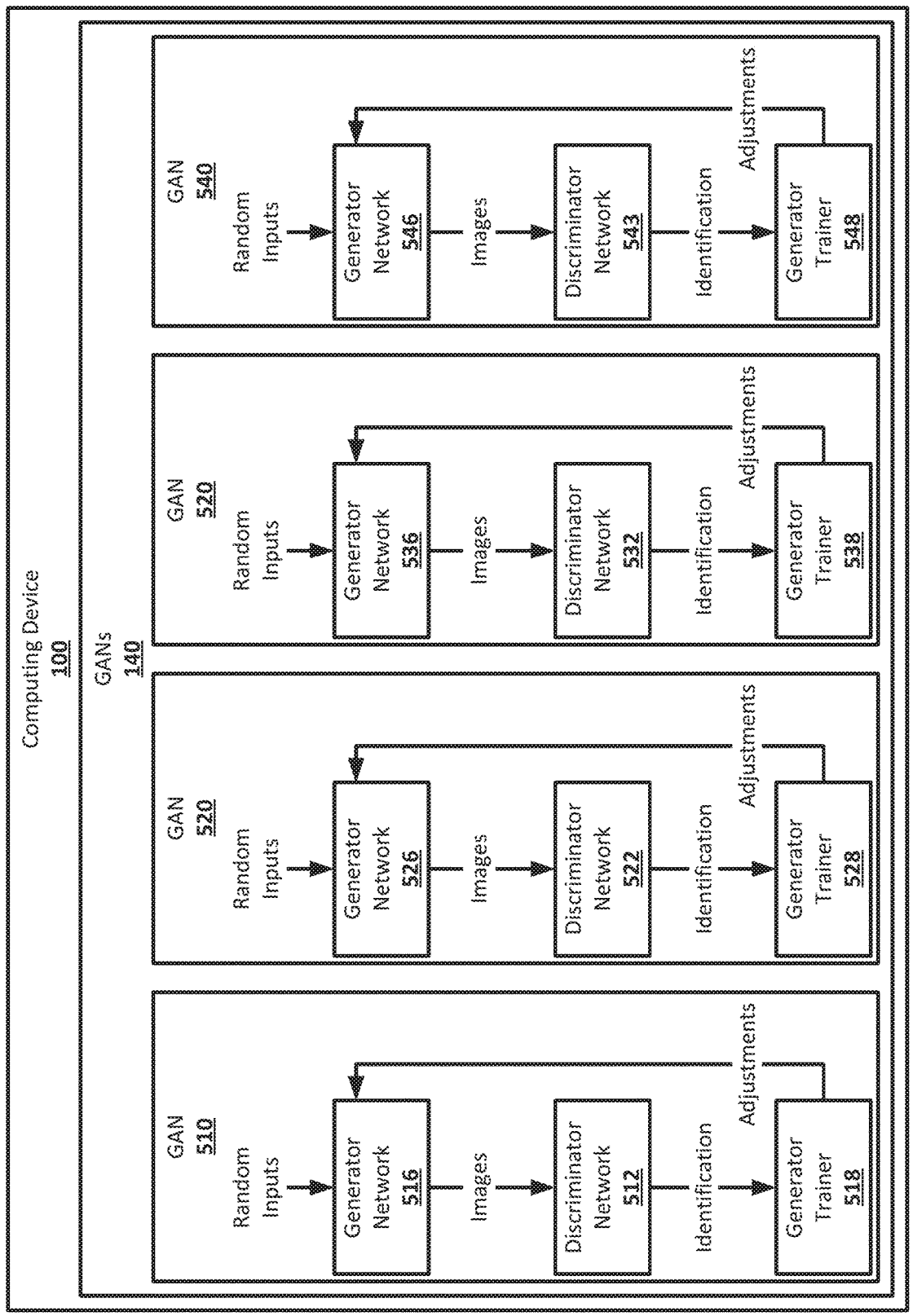
FIG. 5B shows an example arrangement for training data generation for visual search model training according to an implementation of the disclosed subject matter.

FIG. 5B shows an example arrangement for training data generation for visual search model training according to an implementation of the disclosed subject matter. The generator networks of the GANs 140 may be trained to output images that may be considered by the discriminator networks to be positive examples, for example, "in the wild" images that include the item from the images from the one of the GAN training data sets 174 used to train the discriminator network. Each of the GANs 140 may include a generator network, for example, a generator network 516, a generator network 526, a generator network 536, and a generator network 546, and a corresponding generator trainer, for example, a generator trainer 518, a generator trainer 528, a generator trainer 538, and a generator trainer 548. The generator network 516 may, for example, receive a random input, and may output an image. The image may be input to the discriminator network 512, which may output an indication as to whether the discriminator network considers the image to be a positive example or negative example from the GAN training data set 401, for example, whether the image is considered by the discriminator network 512 to be "in the wild" images that include the item from the images that are positive examples, in GAN training data set 401. If the discriminator network 512 outputs that the image is a negative example, the generator trainer 518 may determine and apply adjustments to the generator network 516, for example, through backpropagation. The generator trainer 518 may determine the adjustment to the generator network 516 through, for example, a loss function for the generation network 516.

Any number of random inputs may be input to the generator networks of the GANs 140, over any suitable period of time, to train the generator networks during a training cycle for the generator networks. For example, the generator network 516 may be trained for a set period of time, such as for one hour, regardless of the number of random inputs the generator network 516 is able to generate images for over that time period, with the training cycle for the generator network 516 ending after the end of the period of time.

After the generator networks of the GANs 140 have been trained, for example, for any suitable period of time or on some number of random inputs, the discriminator networks of the GANs 140 may be trained again. Images output by the generator networks during the training of the generator networks may be added to the GAN training data sets 174 to be used during the next round of training the discriminator networks.

A training cycle for the GANs 140 may alternate between training cycles for the discriminator networks and the generator networks any suitable number of times, and the end of the training cycle for the GANs 140 may be determined in any suitable manner. For example, training may continue until the discriminator networks achieve threshold levels of accuracy in their indications for input webpage images from the training data set 162 and a threshold percentage of images output by the generator network 134 are estimated by the discriminator network 132 to be images of webpages that would be assigned high scores.

Figure 6:
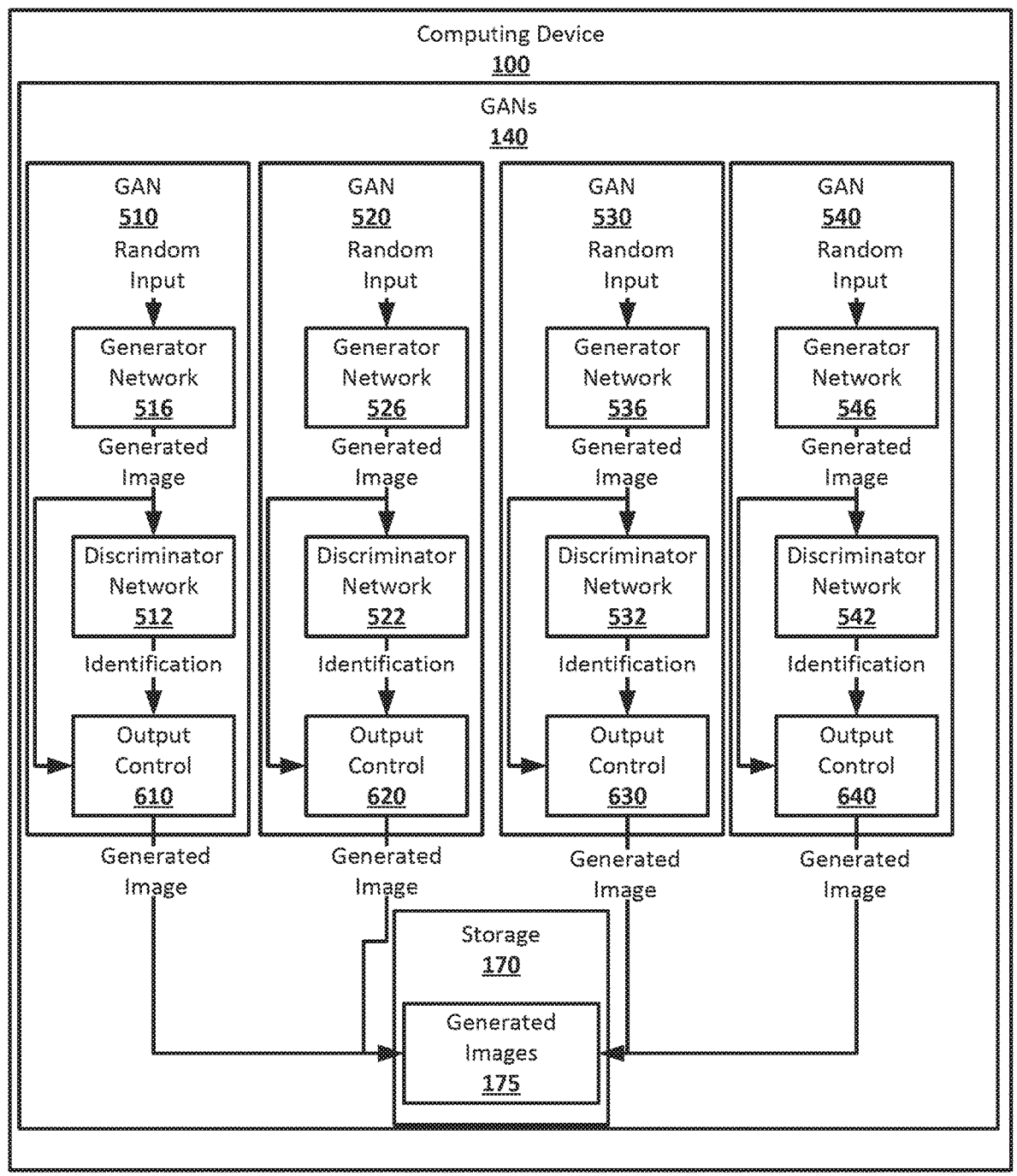
FIG. 6 shows an example arrangement for training data generation for visual search model training according to an implementation of the disclosed subject matter.

FIG. 6 shows an example arrangement for training data generation for visual search model training according to an implementation of the disclosed subject matter. After being trained, the GANs 140 may be used to generate images. The images output by the GANs 140 may be similar to the images that were labeled as positive examples in the GAN training data sets 174. For example, images output by the GAN 510 may be similar to images labeled as positive examples in the GAN training data set 401. If the images labeled as positive examples in the GAN training data set 401 were "in the wild" images of people wearing gloves, the images output by the GAN 510 may be generated images that appear to be "in the wild" and may include images of generated gloves being worn by generated people. The images output by each of the GANs 140 may depend on which of the GAN training data sets 174 was used to train that one of the GANs 140. For example, the images labeled as positive examples in the GAN training data set 402 may be "in the wild" images of people wearing jeans. The GAN 520, after being trained using the GAN training data set 402, may output generated images that appear to be "in the wild" and may include images of generated jeans being worn by generated people.

Random inputs may be input to the generator networks of the GANs 140. The generator networks of the GANs 140, for example, the generator network 516, the generator network 526, the generator network 536, and the generator network 546, may output images to their corresponding discriminator networks, for example, the discriminator network 512, the discriminator network 522, the discriminator network 532, and the discriminator network 542. The discriminator networks of the GANs 140 may output whether they identify the input images as positive or negative examples to a corresponding output control, for example, an output control 610, output control 620, output control 630, and output control 640. The output controls may control the output of the GANs 140 by determining if an indication output by a discriminator network based on an image generated by a generator network indicates that the image is a positive example or negative example. The output controls may allow images generated by a generator network to be output from the GANs 140 when the indication from a discriminator network for the image indicates that the image is a positive example. Otherwise, the image may be discarded. For example, an image generated by the generated network 516 may be input to the discriminator network 512. If the discriminator network 512 outputs an indication that the image is a positive example, the output control 610 may output the image from the GAN 510. The output controls may ensure that images output from the GANs 140 may appear to be "in the wild" images, and may include an image of an item that is of the same type, or has a property of, the items in images that were labeled as positive examples in the GAN training data sets 174. In some implementations, the GANs 140 may not use discriminator networks and output controls when outputting images, and all images generated by the generator networks may be output by the GANs 140. Images may be output from the GANs 140 in any suitable format, including, for example, in any suitable image file format. The images generated and output by the GANs 140 may be stored as generated images 175 in the storage 170.

Figure 7:
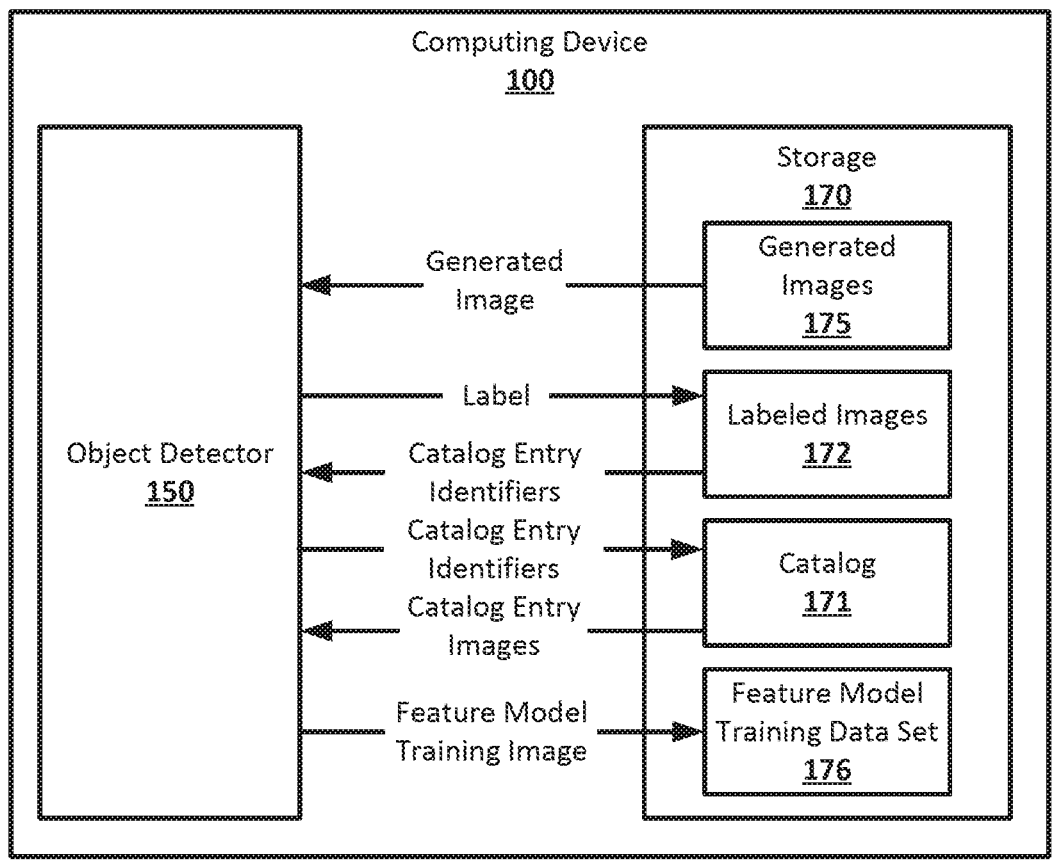
FIG. 7 shows an example arrangement for training data generation for visual search model training according to an implementation of the disclosed subject matter.

FIG. 7 shows an example arrangement for training data generation for visual search model training according to an implementation of the disclosed subject matter. The object detector 150 may receive the generated images 175. The objects detected in the generated images 175 by the object detector 150 may be the images of generated items of the same type as the items in the catalog entries of the catalog. The object detector 150 may, for example, use the labels of the generated images 175 to determine which object to look for in the generated images 175. For example, if the generated image has the label "gloves", the object detector 150 may search the generated image for an object that appears to be gloves.

After detecting an image of a generated item in a generated image, the object detector 150 may perform object transference, transferring an image of an item from a catalog entry of the catalog onto the image of the generated item in one of the generated images 175. The object detector 150 may use the label for the object detected in the generated image to locate images with that label in the labeled images 172. For example, the object detector 150 may determine to use the label "gloves" to locate images in the labeled image 172 that were also labeled with "gloves." The object detector 150 may use catalog entry identifiers, which may be, for example, reference or links to catalog entries in the catalog 171, from the labeled images 172 that correspond to the label from the generated image to look up catalog entries in the catalog 171. For example, the object detector 150 may use catalog entry identifiers from images labeled with "gloves" to locate catalog entries with the item of gloves from the catalog 171. The object detector 150 may retrieve images from the looked-up catalog entries in the catalog 171.

The images retrieved from the catalog entries in the catalog 171 may be used in the object transference. Object transference performed by the object detector 150 may result in a feature model training image. In some implementations, the object detector 150 may use the images looked-up by label in the labeled images 172 for object transference. The feature model training images may be augmented in any suitable manner, having any suitable augmentations applied to change the appearance of the feature model training images. The augmentations may include, for example, changing the hue, lighting and color of the entirety of a feature model training image or of sections of the feature model training images. The augmentations may also include, for example, rotating, stretching, or shrinking, an object, such as an item or a person, in the feature model training images. The augmentations may be applied randomly to the feature model training images.

The object detector 150 may label the feature model training images generated through object transference with an identifier for the catalog entry of the item whose images were transferred during the generation of the feature model training image. The feature model training image may also be labeled with, for example, the labels that were applied to the image of the item form the catalog when the labeled images were generated. The feature model training images, with labels, may be stored in the storage 170 as part of a feature model training data set 176.

Figure 8A:
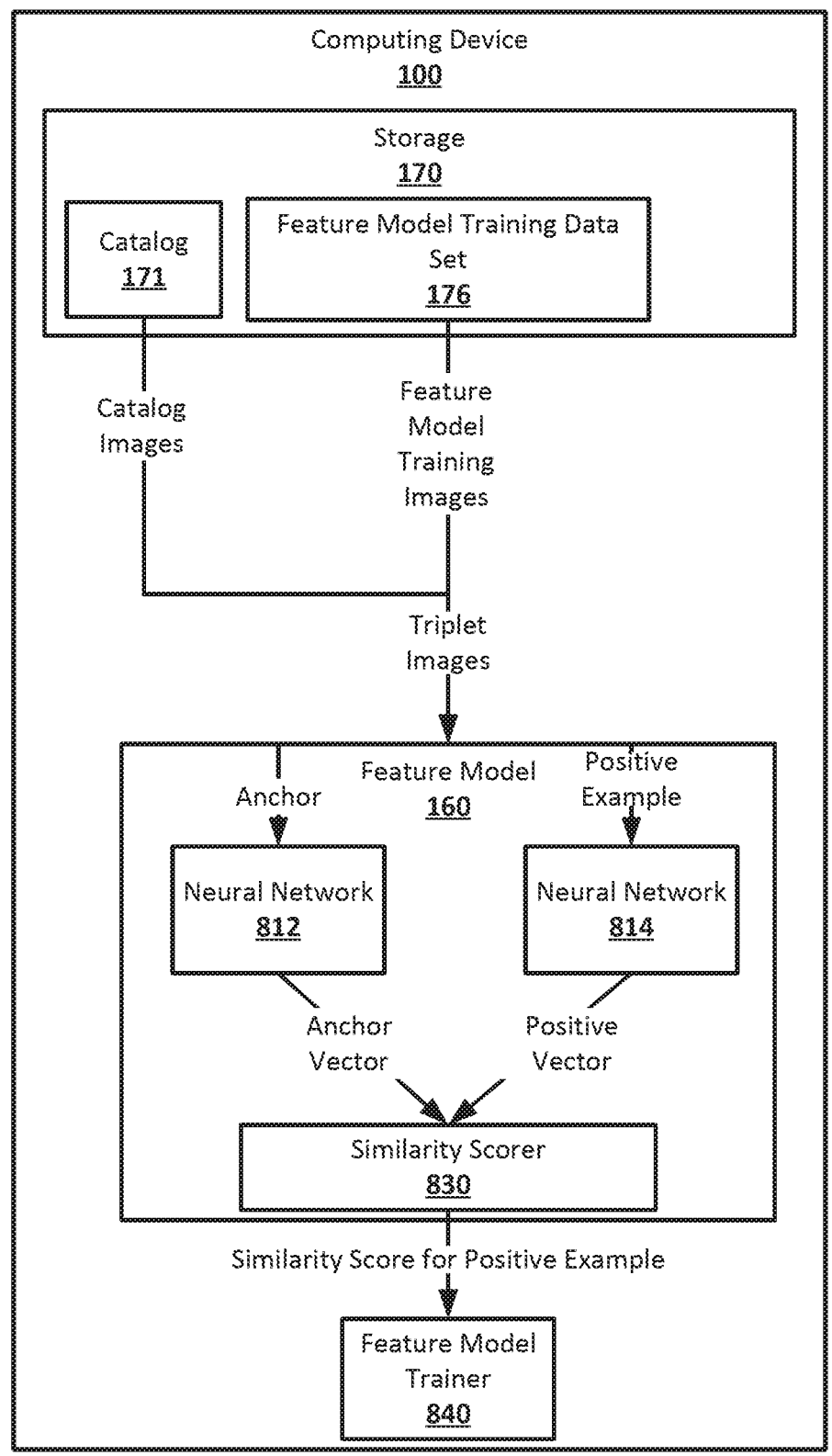
FIG. 8A shows an example arrangement for training data generation for visual search model training according to an implementation of the disclosed subject matter.

FIG. 8A shows an example arrangement for training data generation for visual search model training according to an implementation of the disclosed subject matter. The feature model 160 may be trained for any suitable period of time, and in any suitable manner, using the feature model training data set 176, to determine catalog entries from the catalog 171 that include items that match, or are similar to, items in target images input to the feature model 160.

The feature model 160 may, for example, be a Siamese neural network with triplet loss. The Siamese neural network may include two parallel convolutional networks, for example, the neural network 812 and the neural network 814, which may have the same weights. To train the Siamese neural network using the triplet loss function, the feature model training images from the feature model training data set 176 and images from catalog entries of the catalog 171 may be used to create triplets of images. Each triplet may include an anchor example, which may be an image of an item from a catalog entry of the catalog 171, a positive example, which may be feature model training image that is labeled with the catalog entry, indicating that object transference was used to place the item from the catalog entry into the feature model training image, and a negative example, which may be a feature model training image that is not labeled with the catalog entry, and may be labeled with a different catalog entry. For example, the anchor image may be an image from a catalog entry for gloves from the catalog 171, and the image may include an image of the gloves, either from "in the wild" or from studio or professional photography. The positive example may be one of the feature model training images that includes a link to the catalog entry for gloves that the anchor image was taken from. The negative example may be one of the feature model training images that is not labeled with the link to the catalog entry for gloves that the anchor image was taken from, and may include an image of different gloves, or of an entirely different item, such as, for example, a jacket.

The anchor example may be input, as, for example, a feature vector, into the neural network 812, and the positive example may be input as, for example, a feature vector, into the neural network 814. The neural network 812 may output an anchor vector based on the anchor example. The anchor vector may be a feature vector of any suitable length. The neural network 814 may output a positive vector based on the positive example. The positive vector may be a feature vector of the same length as the anchor vector. A similarity scorer 830 of the feature model 160 may receive both the anchor vector and positive vector, and generate a similarity score for the positive example that may be based on the distance between the anchor vector and the positive vector, indicating how similar the anchor vector is to the positive vector. The similarity score for the positive example may be sent to a feature model trainer 840.

Figure 8B:
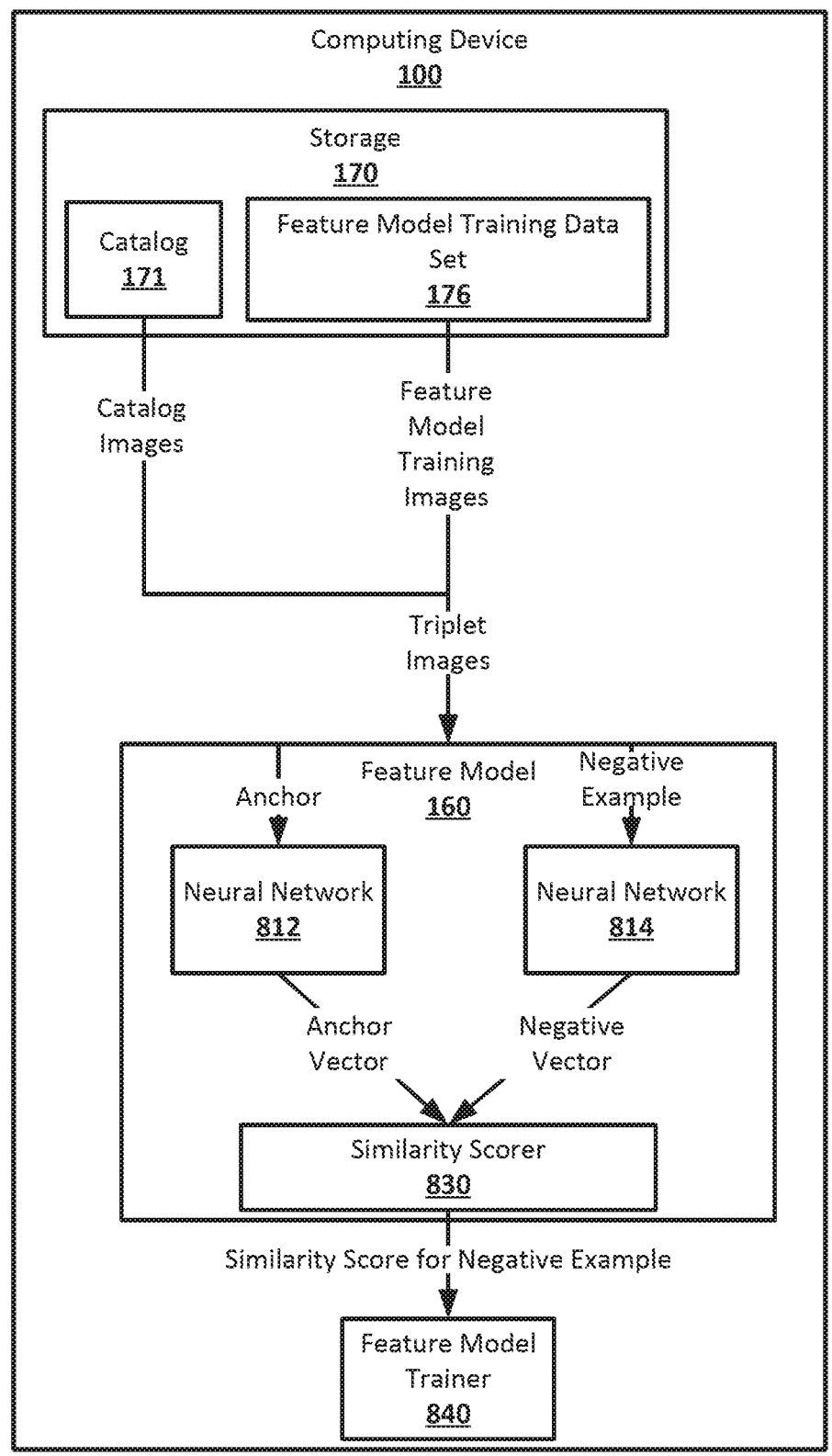
FIG. 8B shows an example arrangement for training data generation for visual search model training according to an implementation of the disclosed subject matter.

FIG. 8B shows an example arrangement for training data generation for visual search model training according to an implementation of the disclosed subject matter. The negative example may be input as, for example, a feature vector, into the neural network 814. The neural network 814 may output a negative vector based on the negative example. The negative vector may be a feature vector of the same length as the anchor vector. The similarity scorer 830 of the feature model 160 may receive the negative vector, and may generate a similarity score for the negative example that may be based on the distance between the previously received anchor vector and the negative vector, indicating how similar the anchor vector is to the negative vector. The similarity score for the negative example may be sent to a feature model trainer 840.

Figure 8C:
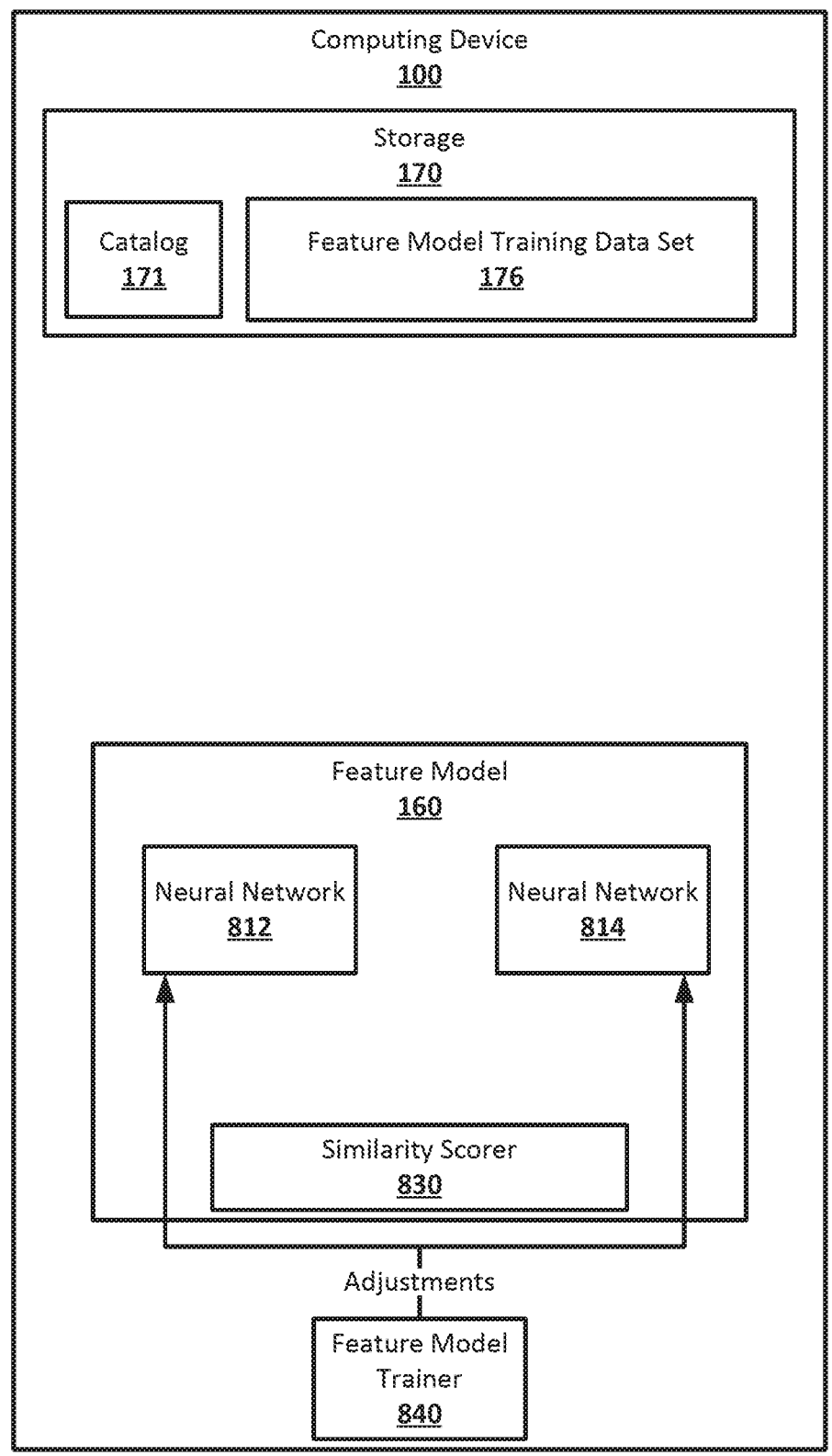
FIG. 8C shows an example arrangement for training data generation for visual search model training according to an implementation of the disclosed subject matter.

FIG. 8C shows an example arrangement for training data generation for visual search model training according to an implementation of the disclosed subject matter. The feature model trainer 840 may implement a triplet loss function to determine adjustments for the neural network 812 and the neural network 814 of the feature model 160. The feature model trainer 840 may, for example, determine the distance between the anchor vector and both the positive vector and the negative vector using the similarity scores. The distance may be used to determine adjustments for the neural network 812 and the neural network 914 based on the triplet loss function which may seek to minimize the distance between anchor vectors and positive vectors while maximizing the distance between anchor vectors and negative vectors. The same adjustments may be applied to both the neural network 812 and the neural network 814.

The feature model 160 may be trained with any suitable number of triplets using any suitable number of feature model training images from the feature model training data set 176 for any suitable period of time.

Figure 9:
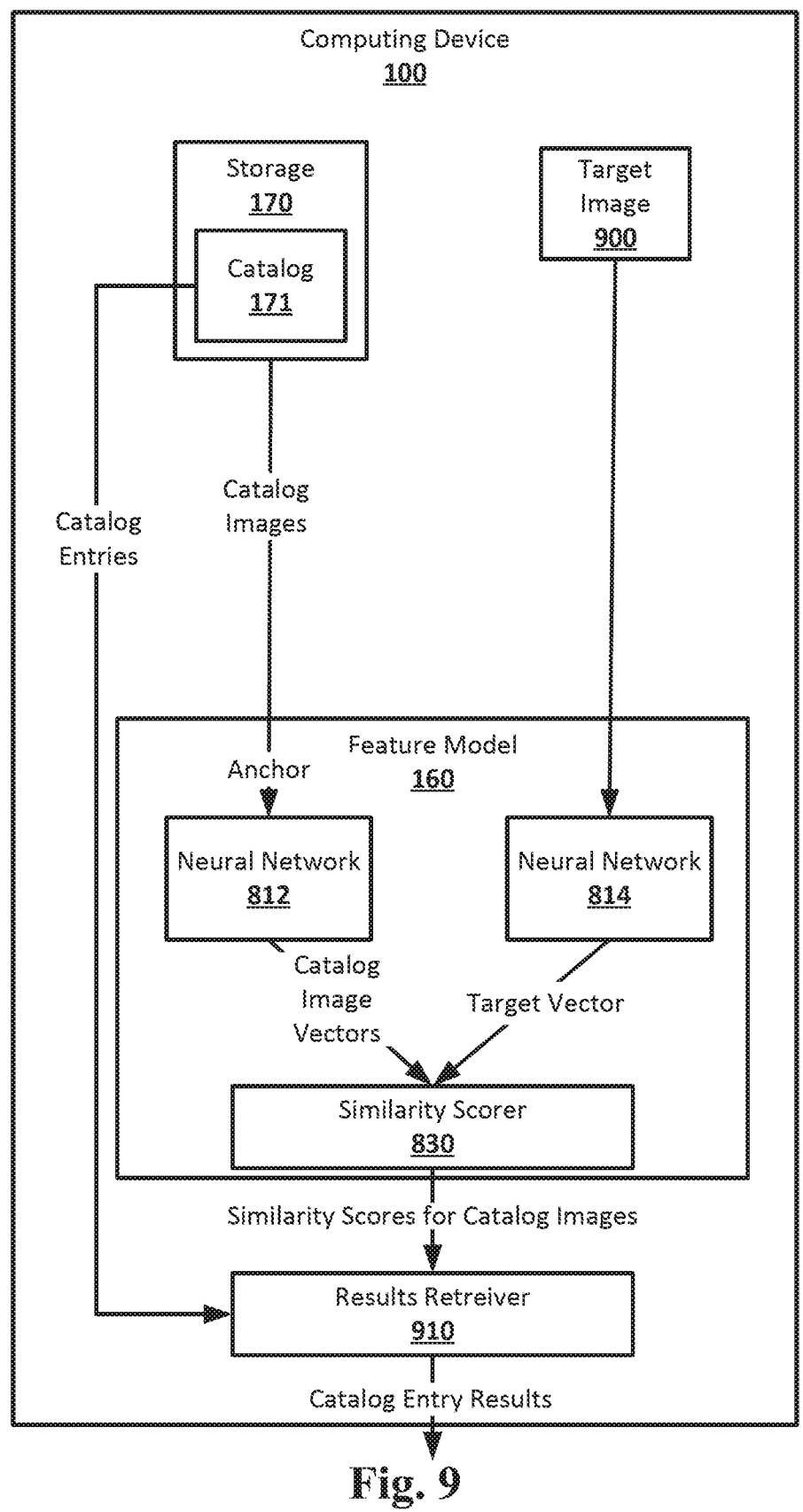
FIG. 9 shows an example arrangement for training data generation for visual search model training according to an implementation of the disclosed subject matter.

FIG. 9 shows an example arrangement for training data generation for visual search model training according to an implementation of the disclosed subject matter. After the feature model 160 is trained, the feature model 160 may be used for visual search. For example, a target image that includes an item may be input to the feature model 160. The target image may be, for example, an "in the wild" image uploaded to the feature model 160 through a search function of an e-commerce website. The feature model 160 may determine which image from a catalog entry of the catalog 171 is most similar to the "in the wild" image, for example, which catalog entries are for items that either are, or are most similar to, the item in the "in the wild" image.

For example, a target image 900 may be input to the feature model 160. The target image 900 may be an image received from any suitable source, such as, for example, being uploaded to the computing device 100 from another computing device or system. For example, the target image 900 may be received through an interface for visual search which may be available, for example, through a web browser or application. The target image 900 may be, for example, an "in the wild" image that includes an image of an item. The catalog entries from the catalog 171 may also be input to the feature model 160. The neural network 812 may output catalog image vectors based on the catalog images, and the neural network 814 may output a target vector based on the target image. The catalog image vectors and target vector may be vectors of the same length. The similarly scorer may generate a similarity score between each of the catalog image vectors and the target vector. The similarity scores may be sent to a results retriever 910, which may retrieve the catalog entries from the catalog 171 that include the catalog images whose catalog image vectors received similarity scores indicating they were most similar to the target image. This may retrieve catalog entries from the catalog 171 for items that are most visually similar to the item in the target image 900. These catalog entries may be returned as catalog entry results, for example, to a computing device or system that submitted the target image 900.

Figure 10:
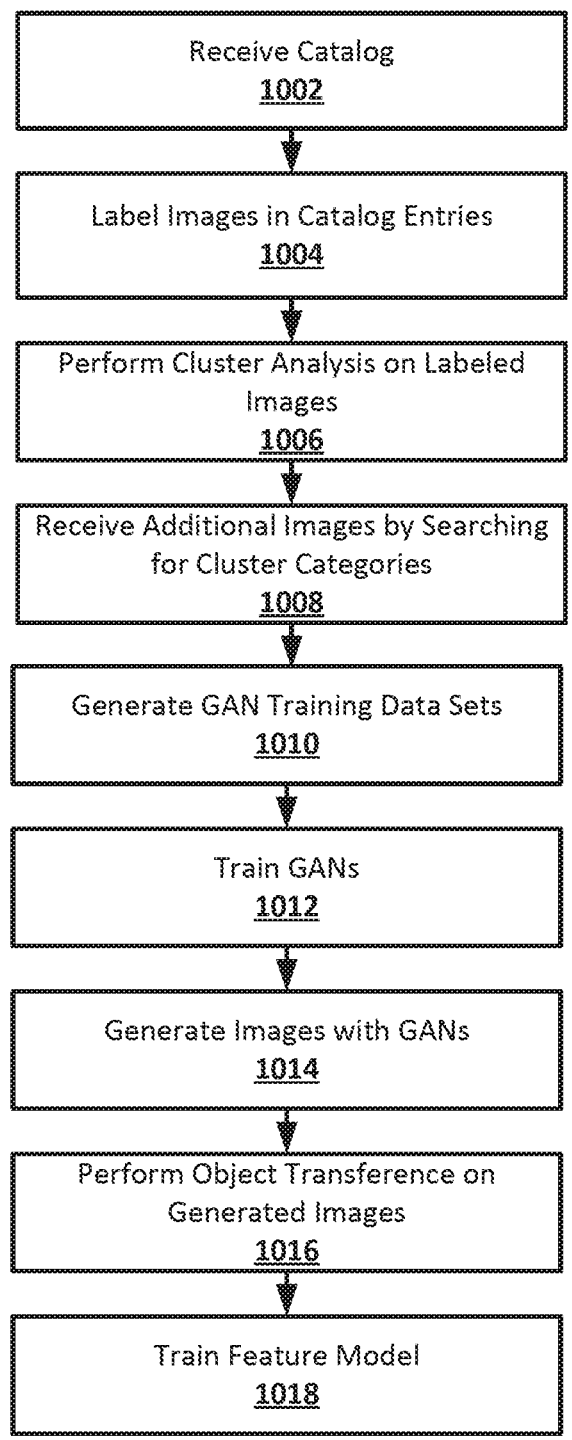
FIG. 10 shows an example procedure suitable for training data generation for visual search model training according to an implementation of the disclosed subject matter.

FIG. 10 shows an example procedure suitable for training data generation for visual search model training according to an implementation of the disclosed subject matter. At 1002, a catalog may be received. For example, the catalog 171 may be received at the computing device 100. The catalog 171 may include any number of catalog entries. Each catalog entry may include images of an item, and a description, such as text, and metadata, about the item. The catalog 171 may be received in any suitable format. For example, the catalog 171 may be in HTML, XML, or a suitable a database format. The catalog 171 may, for example, include catalog entries for products that are to be sold on e-commerce website.

At 1004, images in catalog entries may be labeled. For example, the labeler 110 may label images from catalog entries in the catalog 171 using the descriptions and metadata from the catalog entries. The labeler 110 may also add labels to an image based on elements of the image that may not be described in the data for the catalog entry. For example, if an image includes a person wearing gloves outdoors, the labeler 110 may label the image with "person" and "outdoors". Images labeled by the labeler 110 may be stored in the labeled images 172.

At 1006, cluster analysis may be performed on the labeled images. For example, the cluster analyzer 120 may perform cluster analysis on the labeled images 172. The cluster analysis may be a multiple embedding cluster analysis which may organize the labeled images 172 into the category clusters 173 according to their labels in multiple dimensions. The cluster analyzer 120 may create any number of category clusters, each of which may represent a category from the labels of the labeled images 172. A single one of the labeled images 172 may be in multiple ones of the category clusters 173. A labeled image may, for example, be clustered according to its color, shape, and use into a separate cluster for each category. For example, a labeled image of leather gloves, with the label "leather" and "gloves" may be in both the category cluster 301, which may be a category cluster for "gloves", and the category cluster 302, which may be a category cluster for "leather." Each category cluster, such as the category cluster 301 may include references or links to images from the labeled images 172 that were sorted into that category cluster by the category analyzer 120.

At 1008, additional images may be received by searching for cluster categories. For example, the image retriever 130 may perform a search in any suitable image database using the categories of the category clusters 173 as search terms. The images obtained by the image retriever 130 may include "in the wild" images, which may be, for example, images that are not the result of studio photography or other professional photography, and may be images in which items similar to the items from the catalog 171 in the labeled images 172 appear. The image retriever 130 may label the images obtained through a search with the terms that were searched to obtain the image, which may be categories from the category clusters 173. The image retriever 130 may add the labeled images to the category clusters 173. A labeled image from the image retriever 130 may be added to the category clusters whose categories were used to label the image, as those may be the search terms used to find the image.

At 1010, GAN training data sets may be generated. For example, images for a category cluster, including both the images from the labeled images 172 and images added by the image retriever 130, may be added as positive examples to a GAN training data set for that category as part of GAN training data sets 174. The same image may appear in multiple ones of the GAN training data sets 174 if that image was clustered into multiple categories or was obtained using a search term that included multiple categories. Images with labels that do not belong to the category of a GAN training data set may also be added to a GAN training data set and may be labeled as negative examples. The GAN training data sets 174 may be stored in any suitable format, and may store copies of the images from the labeled images 172 and the image retriever 130, or may use references or links to the images.

At 1012, GANs may be trained. For example, the discriminator networks of the GANs 140 may be trained using images from the of the GAN training data sets 174 to identify "in the wild" images that include an item from the images from that one of the GAN training data sets 174. Each of the GAN training data sets 174 may be input to a separate one of the GANs 140. The images from the GAN training data sets 174 may be input to the GANs 140 in any suitable form, such as, for example, as feature vectors. The discriminator networks of the GANs 140 may identify input images as either positive examples or negative examples. The discriminator trainers of the GANs 140 may determine errors made by the discriminator networks in identifying positive examples and negative examples, and adjust the discriminator networks through, for example, backpropagation to adjust the weights of the neural network of the discriminator networks. Any number of images from one of the GAN training data sets 140 may be input to the discriminator networks of the GANs 140, over any suitable period of time, to train the discriminator networks of the GANs 140 during a training cycle.

The generator networks of the GANs 140 may be trained to output images that may be considered by the discriminator networks to be positive examples, for example, "in the wild" images that include the item from the images from the one of the GAN training data sets 174 used to train the discriminator network. A generator network may, for example, receive a random input, and may output an image. The image may be input to a discriminator network, which may output an indication as to whether the discriminator network considers the image to be a positive example or negative example from the GAN training data set used to train the discriminator network. If the discriminator network outputs that the image is a negative example, the generator trainer may determine and apply adjustments to the generator network. Any number of random inputs may be input to the generator networks of the GANs 140, over any suitable period of time, to train the generator networks during a training cycle for the generator networks. After the generator networks of the GANs 140 have been trained, for example, for any suitable period of time or on some number of random inputs, the discriminator networks of the GANs 140 may be trained again. A training cycle for the GANs 140 may alternate between training cycles for the discriminator networks and the generator networks any suitable number of times, and the end of the training cycle for the GANs 140 may be determined in any suitable manner.

At 1014, images may be generated with the GANs. For example, random inputs may be input to each of the GANs 140, which may output images that may be similar to the images that were labeled as positive examples in the GAN training data sets 174. The images output by each of the GANs 140 may depend on the one of the GAN training data sets 174 used to train that one of the GANs 140. The generated images may, for example, appear to be "in the wild" images that include images of items from the catalog. The images generated and output by the GANs 140 may be stored as generated images 175 in the storage 170.

At 1016, object transference may be performed on the generated images. For example, the object detector 150 may receive a generated image from the generated images 175, detect objects that may be images of generated items in the generated images 175, and perform object transference, transferring an image of an item from a catalog entry of the catalog onto the image of the generated item in one of the generated images 175. The object detector 150 may use the label for the object detected in the generated image to locate images with that label in the labeled images 172. For example, the object detector 150 may determine to use the label "gloves" to locate images in the labeled image 172 that were also labeled with "gloves." The object detector 150 may use catalog entry identifiers, which may be, for example, reference or links to catalog entries in the catalog 171, from the labeled images 172 that correspond to the label from the generated image to look up catalog entries in the catalog 171. The images retrieved from the catalog entries in the catalog 171 may be used in the object transference. Object transference performed by the object detector 150 may result in a feature model training image. The feature model training images generated through object transference may be labeled, for example, by the object detector 150, with an identifier for the catalog entry of the item whose images were transferred during the generation of the feature model training image. The feature model training image may also be labeled with, for example, the labels that were applied to the image of the item form the catalog when the labeled images were generated. The feature model training images, with labels, may be stored in the storage 170 as part of a feature model training data set 176.

At 1018, a feature model may be trained. For example, the feature model training data set 176 may be used to train the feature model 160 to identify similar images of the type in the feature model training data set 176. For example, the feature model training data set 176 and the catalog 171 may be used to generate triplets with anchor example, which may be an image of an item from a catalog entry of the catalog 171, a positive example, which may be feature model training image that is labeled with the catalog entry, indicating that object transference was used to place the item from the catalog entry into the feature model training image, and a negative example, which may be a feature model training image that is not labeled with the catalog entry, and may be labeled with a different catalog entry. The images from a triplet may be input to the neural network 812 and the neural network 814 of the feature model 160, which may output vectors based on each image. The similarity scorer 830 may score the similarity between the output vector for the anchor image and each of the output vectors for the positive example and negative example. The feature model trainer 840 may use the similarity scores and a loss function to adjust the neural network 812 and the neural network 814, for example, using backpropagation to adjust the weights, in order to minimize the distance between the output vector for the anchor image and the output vectors for positive examples and maximize the distance between the output vector for the anchor image and the output vectors for negative examples.

Figure 11:
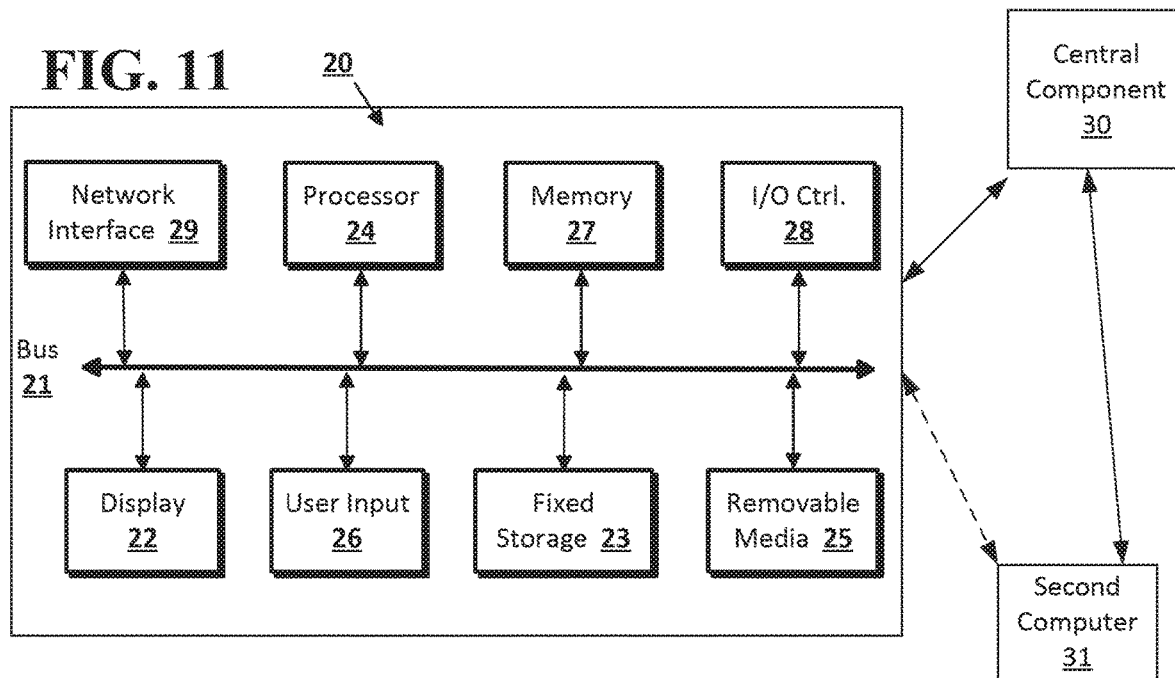
FIG. 11 shows a computer according to an implementation of the disclosed subject matter.

Implementations of the presently disclosed subject matter may be implemented in and used with a variety of component and network architectures. FIG. 11 is an example computer 20 suitable for implementing implementations of the presently disclosed subject matter. As discussed in further detail herein, the computer 20 may be a single computer in a network of multiple computers. As shown in FIG. 11, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 12.

Many other devices or components (not shown) may be connected in a similar manner (e.g., document scanners, digital cameras and so on). Conversely, all of the components shown in FIG. 11 need not be present to practice the present disclosure. The components can be interconnected in different ways from that shown. The operation of a computer such as that shown in FIG. 11 is readily known in the art and is not discussed in detail in this application. Code to implement the present disclosure can be stored in computer-readable storage media such as one or more of the memory 27, fixed storage 23, removable media 25, or on a remote storage location.

Figure 12:
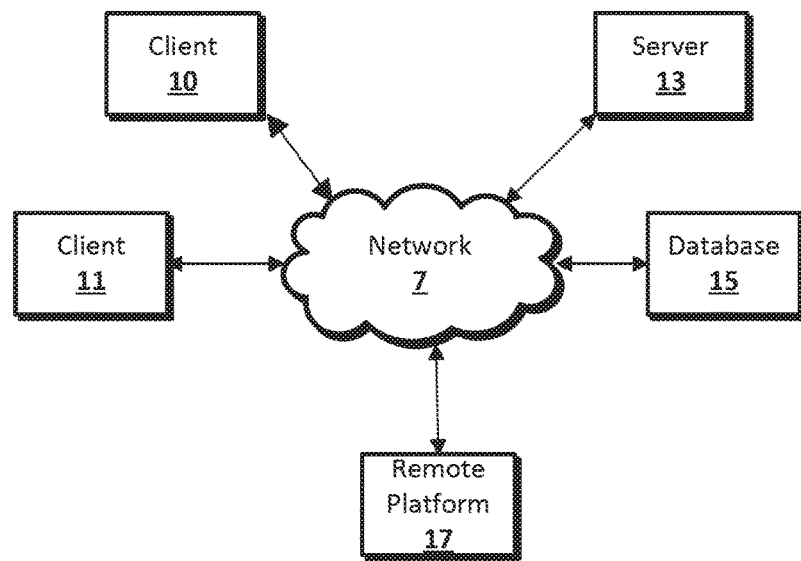
FIG. 12 shows a network configuration according to an implementation of the disclosed subject matter.

FIG. 12 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
   receiving a catalog comprising one or more catalog entries, each catalog entry comprising one or more images of an item and data about the item;
   applying labels to the one or more images of the items in the one or more catalog entries based on the data about the items in the one or more catalog entries;
   sorting the one or more images of the items into clusters using cluster analysis based on the labels applied to the one or more images of the items, wherein each cluster comprises one or more of the labels as categories of the cluster;
   receiving additional images based on searching for the categories of the clusters;
   generating generative adversarial network (GAN) training data sets from the one or more images of the items, the additional images, and the categories of the clusters, wherein each of the GAN training data sets is based on a different cluster;
   training GANs with the GAN training data sets;
   generating, with the GANs, generated images comprising images of generated items; and
   replacing the images of generated items in the generated images with images of items from the one or more catalog entries to create feature model training images, wherein a feature model training data set comprises the feature model training images.

2. The computer-implemented method of claim 1, further comprising:
   training a feature model using the feature model training images from the feature model training data set.

3. The computer-implemented method of claim 2, wherein training the feature model further comprises:
   inputting a triplet of images into the feature model, the triplet comprising an anchor image from a catalog entry of the catalog, a positive example that is a feature model training image that references the catalog entry of the catalog, and a negative image example that is a feature model training that does not reference the catalog entry of the catalog;
   generating, with the feature model, an output vector for the anchor image, an output vector for the positive example, and an output vector for the negative example;
   determining adjustments to the feature model based on a distance between the output vector for the anchor image and the output vector for the positive example and a distance between the output vector for the anchor image and the output vector for the negative example; and
   applying the adjustments to the feature model.

4. The computer-implemented method of claim 2, further comprising:
   receiving, at the feature model, a target image; and
   outputting, by the feature model, indications of one or more catalog entries from the catalog based on the input target image.

5. The computer-implemented method of claim 2, wherein the feature model comprises a Siamese neural network with a triplet loss function.

6. The computer-implemented method of claim 1, wherein replacing the images of generated items in the generated images with images of items from the catalog entries to create feature model training images further comprises using object detection to locate the images of generated items in the generated images.

7. The computer-implemented method of claim 1, further comprising:
   applying augmentations to the feature model training images, the augmentations comprising one or more of changing hue, changing lighting, rotation, and stretching or shrinking an image of a person.

8. The computer-implemented method of claim 1, wherein training GANs with the GAN training data sets further comprises:
   training a discriminator network of one of the GANs using images from one of the GAN training data sets, wherein the one of the GAN training data sets comprises images that are positive examples and images that are negative examples, and wherein the discriminator network is trained to discriminate between the images that are positive examples from images that are negative examples;
   outputting images from a generator network of the GAN to the discriminator network; and
   training the generator network based on whether the discriminator network determines that the images from the generator network are images that are positive examples for the one of the GAN training data sets or negative examples for the one of the GAN training data sets.

9. A computer-implemented system for training data generation for visual search model training comprising:
   one or more storage devices; and
   a processor that receives a catalog comprising one or more catalog entries, each catalog entry comprising one or more images of an item and data about the item, applies labels to the one or more images of the items in the one or more catalog entries based on the data about the items in the one or more catalog entries, sort the one or more images of the items into clusters using cluster analysis based on the labels applied to the one or more images of the items, wherein each cluster comprises one or more of the labels as categories of the cluster, generate generative adversarial network (GAN) training data sets from the one or more images of the items, the additional images, and the categories of the clusters, wherein each of the GAN training data sets is based on a different cluster, train GANs with the GAN training data sets, generate, with the GANs, generated images comprising images of generated items, and replace the images of generated items in the generated images with images of items from the one or more catalog entries to create feature model training images, wherein a feature model training data set comprises the feature model training images.

10. The computer-implemented system of claim 9, wherein the processor further trains a feature model using the feature model training images from the feature model training data set.

11. The computer-implemented system of claim 10, wherein the processor trains the feature model using the feature model training images from the feature model training data set by inputting a triplet of images into the feature model, the triplet comprising an anchor image from a catalog entry of the catalog, a positive example that is a feature model training image that references the catalog entry of the catalog, and a negative image example that is a feature model training that does not reference the catalog entry of the catalog, generating, with the feature model, an output vector for the anchor image, an output vector for the positive example, and an output vector for the negative example, determining adjustments to the feature model based on a distance between the output vector for the anchor image and the output vector for the positive example and a distance between the output vector for the anchor image and the output vector for the negative example, and applying the adjustments to the feature model.

12. The computer-implemented system of claim 10, wherein the processor further receives a target image and outputs indications of one or more catalog entries from the catalog based on the input target image determined using the feature model.

13. The computer-implemented system of claim 10, wherein the feature model comprises a Siamese neural network with a triplet loss function.

14. The computer-implemented system of claim 9, wherein the processor replaces the images of generated items in the generated images with images of items from the catalog entries to create feature model training images further comprises by using object detection to locate the images of generated items in the generated images.

15. The computer-implemented system of claim 9, wherein the processor further applies augmentations to the feature model training images, the augmentations comprising one or more of changing hue, changing lighting, rotation, and stretching or shrinking an image of a person.

16. The computer-implemented system of claim 9, wherein the processor trains GANs with the GAN training data sets by training a discriminator network of one of the GANs using images from one of the GAN training data sets, wherein the one of the GAN training data sets comprises images that are positive examples and images that are negative examples, and wherein the discriminator network is trained to discriminate between the images that are positive examples from images that are negative examples, outputting images from a generator network of the GAN to the discriminator network, and training the generator network based on whether the discriminator network determines that the images from the generator network are images that are positive examples for the one of the GAN training data sets or negative examples for the one of the GAN training data sets.

17. A system comprising: one or more computers and one or more storage devices storing instructions which are operable, when executed by the one or more computers, to cause the one or more computers to perform operations comprising:
    receiving a catalog comprising one or more catalog entries, each catalog entry comprising one or more images of an item and data about the item;
    applying labels to the one or more images of the items in the one or more catalog entries based on the data about the items in the one or more catalog entries;
    sorting the one or more images of the items into clusters using cluster analysis based on the labels applied to the one or more images of the items, wherein each cluster comprises one or more of the labels as categories of the cluster;
    receiving additional images based on searching for the categories of the clusters;
    generating generative adversarial network (GAN) training data sets from the one or more images of the items, the additional images, and the categories of the clusters, wherein each of the GAN training data sets is based on a different cluster;
    training GANs with the GAN training data sets;
    generating, with the GANs, generated images comprising images of generated items; and
    replacing the images of generated items in the generated images with images of items from the one or more catalog entries to create feature model training images, wherein a feature model training data set comprises the feature model training images.

18. The system of claim 17, wherein the instructions further cause the one or more computers to perform operations comprising training a feature model using the feature model training images from the feature model training data set.

19. The system of claim 17, wherein the instructions that cause the one or more computers to perform operations comprising training the feature model further cause the one or more computers to perform operations further comprising:
    inputting a triplet of images into the feature model, the triplet comprising an anchor image from a catalog entry of the catalog, a positive example that is a feature model training image that references the catalog entry of the catalog, and a negative image example that is a feature model training that does not reference the catalog entry of the catalog;
    generating, with the feature model, an output vector for the anchor image, an output vector for the positive example, and an output vector for the negative example;
    determining adjustments to the feature model based on a distance between the output vector for the anchor image and the output vector for the positive example and a distance between the output vector for the anchor image and the output vector for the negative example; and
    applying the adjustments to the feature model.

20. The system of claim 17, wherein the instructions further cause the one or more computers to perform operations further comprising:
  receiving, at the feature model, a target image; and
  outputting, by the feature model, indications of one or more catalog entries from the catalog based on the input target image.

* * * * *